(12) United States Patent
Wu

(10) Patent No.: US 9,591,377 B2
(45) Date of Patent: Mar. 7, 2017

(54) METHOD AND DEVICE FOR RECORDING MULTIMEDIA DATA

(71) Applicant: Huawei Technologies Co., Ltd., Shenzhen, Guangdong (CN)

(72) Inventor: Jie Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 239 days.

(21) Appl. No.: 13/935,656

(22) Filed: Jul. 5, 2013

(65) Prior Publication Data

US 2014/0013369 A1    Jan. 9, 2014

Related U.S. Application Data

(63) Continuation of application No. PCT/CN2012/078175, filed on Jul. 4, 2012.

(51) Int. Cl.
| | |
|---|---|
| *H04N 21/647* | (2011.01) |
| *H04N 21/643* | (2011.01) |
| *H04N 21/2743* | (2011.01) |
| *H04N 21/63* | (2011.01) |
| *H04N 21/8352* | (2011.01) |
| *H04L 29/08* | (2006.01) |
| *H04L 29/06* | (2006.01) |

(52) U.S. Cl.
CPC ....... *H04N 21/647* (2013.01); *H04L 67/1008* (2013.01); *H04N 21/2743* (2013.01); *H04N 21/632* (2013.01); *H04N 21/64322* (2013.01); *H04N 21/8352* (2013.01); *H04L 65/1006* (2013.01)

(58) Field of Classification Search
CPC .................................................. H04N 21/647
USPC .......................................................... 709/206
See application file for complete search history.

(56) References Cited

U.S. PATENT DOCUMENTS

| | | | | |
|---|---|---|---|---|
| 5,822,306 A | * | 10/1998 | Catchpole | ..................... 370/261 |
| 5,867,494 A | * | 2/1999 | Krishnaswamy et al. | .... 370/352 |
| 5,920,705 A | * | 7/1999 | Lyon et al. | ................... 709/240 |

(Continued)

FOREIGN PATENT DOCUMENTS

| | | |
|---|---|---|
| CN | 101102204 A | 1/2008 |
| CN | 101494655 A | 7/2009 |

(Continued)

OTHER PUBLICATIONS

Wikipedia, "Port mirroring", 2015.*

(Continued)

*Primary Examiner* — Ondrej C. Vostal
(74) *Attorney, Agent, or Firm* — Huawei Technologies Co., Ltd.

(57) ABSTRACT

In a network system including a mirror switch, a distribution device and a plurality of recording devices, a method for recording multimedia data is provided. The mirror switch sends communication data to the distribution device and the plurality of recording devices. The distribution device obtains multimedia data identification information from a signaling message included in the communication data, generates a recording instruction which includes the multimedia data identification information, and sends the recording instruction to the recording device to instruct the recording device to record the multimedia data.

14 Claims, 10 Drawing Sheets

(56) References Cited

U.S. PATENT DOCUMENTS

| | | | |
|---|---|---|---|
| 6,122,665 A | 9/2000 | Bar et al. | |
| 6,246,335 B1* | 6/2001 | Tsunoda | 340/7.2 |
| 6,246,752 B1* | 6/2001 | Bscheider et al. | 379/88.22 |
| 6,731,625 B1* | 5/2004 | Eastep et al. | 370/352 |
| 7,024,460 B2* | 4/2006 | Koopmas et al. | 709/206 |
| 7,457,416 B1* | 11/2008 | Elliott | 380/256 |
| 7,720,918 B1* | 5/2010 | Martin et al. | 709/206 |
| 7,836,171 B2* | 11/2010 | Altman | 709/224 |
| 7,869,425 B2* | 1/2011 | Elliott et al. | 370/352 |
| 7,974,269 B2* | 7/2011 | Takeda et al. | 370/352 |
| RE43,346 E* | 5/2012 | Miloushev et al. | 709/213 |
| 8,204,860 B1* | 6/2012 | Ferguson et al. | 707/639 |
| 8,255,542 B2* | 8/2012 | Henson | 709/227 |
| 8,320,536 B2* | 11/2012 | Portman et al. | 379/88.17 |
| 8,347,341 B2* | 1/2013 | Markley et al. | 725/82 |
| 8,364,720 B2* | 1/2013 | Levy | 707/803 |
| 2001/0055274 A1* | 12/2001 | Hegge et al. | 370/229 |
| 2002/0035616 A1* | 3/2002 | Diamond et al. | 709/219 |
| 2002/0059596 A1* | 5/2002 | Sano et al. | 725/39 |
| 2004/0139230 A1* | 7/2004 | Kim | 709/245 |
| 2005/0037708 A1* | 2/2005 | Torvinen | H04L 29/06 |
| | | | 455/41.2 |
| 2005/0097607 A1 | 5/2005 | Kummer et al. | |
| 2005/0207361 A1* | 9/2005 | Rosenberg et al. | 370/282 |
| 2005/0229201 A1 | 10/2005 | Berstis | |
| 2007/0113086 A1* | 5/2007 | Huang et al. | 713/168 |
| 2007/0136445 A1* | 6/2007 | Sweatt, III | H04H 60/27 |
| | | | 709/219 |
| 2007/0156726 A1* | 7/2007 | Levy | G06F 17/3002 |
| 2007/0214257 A1 | 9/2007 | Kurita et al. | |
| 2007/0255915 A1* | 11/2007 | Weaver | 711/162 |
| 2007/0287454 A1* | 12/2007 | Zhu et al. | 455/435.1 |
| 2008/0052344 A1* | 2/2008 | Alecci | H04M 3/12 |
| | | | 709/203 |
| 2008/0080698 A1* | 4/2008 | Williams | H04M 3/42221 |
| | | | 379/266.1 |
| 2008/0084470 A1* | 4/2008 | Hamilton | 348/14.09 |
| 2008/0084984 A1* | 4/2008 | Levy et al. | 379/202.01 |
| 2008/0101278 A1* | 5/2008 | Bengtsson et al. | 370/328 |
| 2008/0144609 A1* | 6/2008 | Kim et al. | 370/352 |
| 2008/0168524 A1* | 7/2008 | Wood et al. | 725/134 |
| 2008/0281696 A1* | 11/2008 | Whitehead | 705/14 |
| 2009/0030968 A1* | 1/2009 | Boudreau et al. | 709/201 |
| 2009/0070429 A1* | 3/2009 | Murphy | 709/206 |
| 2009/0150917 A1* | 6/2009 | Huffman et al. | 725/9 |
| 2009/0172123 A1* | 7/2009 | Ewing | G06F 17/3056 |
| | | | 709/206 |
| 2009/0185665 A1* | 7/2009 | Chen | 379/29.01 |
| 2009/0187951 A1* | 7/2009 | McCarthy et al. | 725/58 |
| 2009/0268885 A1 | 10/2009 | Portman et al. | |
| 2009/0285392 A1* | 11/2009 | Leitheiser et al. | 380/255 |
| 2009/0303897 A1* | 12/2009 | Kouretas et al. | 370/252 |
| 2009/0328118 A1* | 12/2009 | Ravishankar et al. | 725/106 |
| 2010/0066647 A1 | 3/2010 | Tatsuta et al. | |
| 2010/0180316 A1 | 7/2010 | Hasegawa | |
| 2010/0235542 A1* | 9/2010 | Visharam | G06F 15/16 |
| | | | 709/246 |
| 2010/0280907 A1* | 11/2010 | Wolinsky et al. | 705/14.69 |
| 2010/0299191 A1* | 11/2010 | Fernandez Gutierrez | 705/14.5 |
| 2010/0333127 A1* | 12/2010 | Scott et al. | 725/24 |
| 2011/0208859 A1* | 8/2011 | Fernandez Gutierrez | 709/224 |
| 2011/0238855 A1* | 9/2011 | Korsunsky | G06F 21/55 |
| | | | 709/231 |
| 2011/0249571 A1* | 10/2011 | Das et al. | 370/252 |
| 2011/0292930 A1* | 12/2011 | Mobin et al. | 370/352 |
| 2012/0041965 A1* | 2/2012 | Vasquez et al. | 707/758 |
| 2012/0185613 A1* | 7/2012 | Noldus | 709/248 |
| 2012/0254456 A1* | 10/2012 | Visharam | H04N 21/2343 |
| | | | 709/231 |
| 2012/0297431 A1* | 11/2012 | Wang | 725/92 |
| 2012/0320916 A1* | 12/2012 | Sebastian | 370/390 |
| 2013/0031170 A1* | 1/2013 | Pacella et al. | 709/204 |
| 2014/0089504 A1* | 3/2014 | Scholz | H04L 41/5032 |
| | | | 709/224 |

FOREIGN PATENT DOCUMENTS

| | | |
|---|---|---|
| CN | 101674470 A | 3/2010 |
| CN | 101710956 A | 5/2010 |
| CN | 101710965 A | 5/2010 |
| EP | 1414185 A2 | 4/2004 |
| EP | 2051522 A1 | 4/2009 |
| EP | 2506561 A1 | 10/2012 |
| JP | 2006054651 A | 2/2006 |
| JP | 2007058859 A | 3/2007 |
| JP | 2007208577 A | 8/2007 |
| JP | 2007241805 A | 9/2007 |
| JP | 2010283576 A | 12/2010 |
| JP | 2011147007 A | 7/2011 |
| WO | 2009068952 A2 | 6/2009 |

OTHER PUBLICATIONS

Thomas, "A Distributed Network Performance and Traffic Analyser", 2009.*

Johnsen, "Conteent Distribution in Ad Hoc Networks", 2006.*

Ding et al., "Interactive Multimedia Mirror System Design", 2008.*

Sheau-RU Tong et al.,"A video caching policy for providing differentiated service grades and maximizing system revenue in hierarchical video servers", The Journal of Systems and Software, 2003, total 18 pages.

Kundan Narendra Singh, "Reliable,Scalable and Interoperable Internet Telephony", Master Thesis, Jan. 1, 2006, total 383 pages.

* cited by examiner

```
INVITE sip:8000@192.162.1.29:5067;user=phone SIP/2.0
Via: SIP/2.0/UDP 192.167.1.248:5060;branch=z9hG4bKrrzja94j57az0r52300m54mrx
Call-ID: a7o79zo5j090x5xx9x33yayy4yo01y93@192.167.1.248
From: <sip:1086@192.167.1.248;user=phone>;tag=1523z0o9
To: <sip:8000@192.162.1.29:5067>
CSeq: 1 INVITE
Contact: <sip:1086@192.167.1.248:5060;user=phone>
Allow:
INVITE,ACK,OPTIONS,BYE,CANCEL,REGISTER,INFO,PRACK,SUBSCRIBE,NOTIFY,UPDATE,REFER,
PUBLISH
Max-Forwards: 70
Content-Length: 338
Content-Type: application/sdp v=0
o=HuaweiUAPV100R002C06SPC100B017 155 155 IN IP4 192.167.1.248
s=Sip Call
c=IN IP4 192.167.1.248
t=0 0
m=audio 10574 RTP/AVP 8 0 18 4 97
a=rtpmap:8 PCMA/8000
a=ptime:20
a=rtpmap:0 PCMU/8000
a=rtpmap:18 G729/8000
a=rtpmap:4 G723/8000
a=rtpmap:97 telephone-event/8000
a=fmtp:97 0-15
a=fmtp:18 annexb=no
a=fmtp:4 annexa=no
```

FIG. 3-1

```
SIP/2.0 200 OK
Via: SIP/2.0/UDP 192.167.1.248 :5060;branch=z9hG4bKrrzja94j57az0r52300m54mrx
From: <sip:1086@192.167.1.248;use r=phone>;tag=152 3z0o9
To: <sip: 8000@192.162.1.2 9:5067>;tag=1570 184523
Call-ID: a7o79zo5j090x5xx9x33yayy4yo01y93@192.167.1.248..
CSeq: 1 INVITE..
Contact: <sip:8000@192.162.1.29:5067>
Content-Type: application/sdp
Allow: INVITE, INFO, PRACK, ACK,BYE, CANCEL, OPTIONS, NOTIFY, REGISTER, SUBSCRIBE,
REFER, PUBLISH, UPDATE, MESSAGE
User-Agent: Huawei eSpace 7850 2.60.94.19
Content-Length: 219 v=0
o=- 20042 20042 IN IP4 192.162.1.29
s=SDP data
c=IN IP4 192.162.1.29
t=0 0
m=audio 11798 RTP/AVP 18 97
a=rtpmap:18 G729/8000
a=fmtp:18 annexb=no
a=ptime:20
a=fmtp:97 0-15
a=rtpmap:97 telephone-event/8000
```

FIG. 3-2

METHOD AND DEVICE FOR RECORDING MULTIMEDIA DATA

CROSS-REFERENCE TO RELATED APPLICATIONS

This application is a continuation of International Application No. PCT/CN2012/078175, filed Jul. 4, 2012, and titled "METHOD, DEVICE AND SYSTEM FOR RECORDING MULTIMEDIA DATA", which is hereby incorporated by reference in its entirety.

FIELD

The present disclosure relates to the field of communications technologies, and in particular, relates to a method, device and system for recording multimedia data.

BACKGROUND

In multimedia data communication (e.g., audio and video communication), it is a common function to record multimedia data (e.g., audio data and video data) transferred between communication terminals. With the development of a unified communication (UC) service and an IP contact center (IPCC) service, clients already regard a recording function as an indispensable feature of a newly built networking office, and at the same time need reconstruction of a large amount of offices in existing networks to add the recording function.

Currently a mainstream recording method is based on a multimedia data distribution mechanism. A distribution device first acquires all multimedia data from received data packets and distributes all the multimedia data to each recording device in a centralized manner. Each recording device obtains multimedia data of a certain number of paths and records the obtained multimedia data as files. For example, assuming 3000 calls at the same time, the data of the 3000 calls includes 3000 pieces of multimedia data (including audio and video data) and signaling for establishing and managing channels used for transmitting the 3000 pieces of multimedia data, and after receiving data packets of the 3000 calls, the distribution device first obtains multimedia data (e.g., audio and video data) of 3000 calls from the data packets and distributes the 3000 pieces of multimedia data to 12 recording devices for recording. For example, the 3000 pieces of multimedia data are evenly distributed to 12 recording devices for recording in an even distribution manner, and each recording device obtains 250 pieces of multimedia data, and records the received 250 pieces of multimedia data as files.

The distribution device needs to process and distribute all the received multimedia data. If the data amount of the multimedia data processed and distributed by the distribution device at the same time is relatively large, the amount of consumed resources is large, causing that the received multimedia data cannot be processed and distributed in time and resulting in a performance bottleneck, so that efficiency of recording multimedia data is relatively low.

BRIEF DESCRIPTION OF THE DRAWINGS

FIG. 3-1 and FIG. 3-2 show examples of a session initiation protocol (SIP) message;

FIG. 4-1 and FIG. 4-2 show examples of an Internet Protocol (IP) packet encapsulating a real-time transport protocol (RTP) packet;

DETAILED DESCRIPTION OF THE EMBODIMENTS

Figure 1:
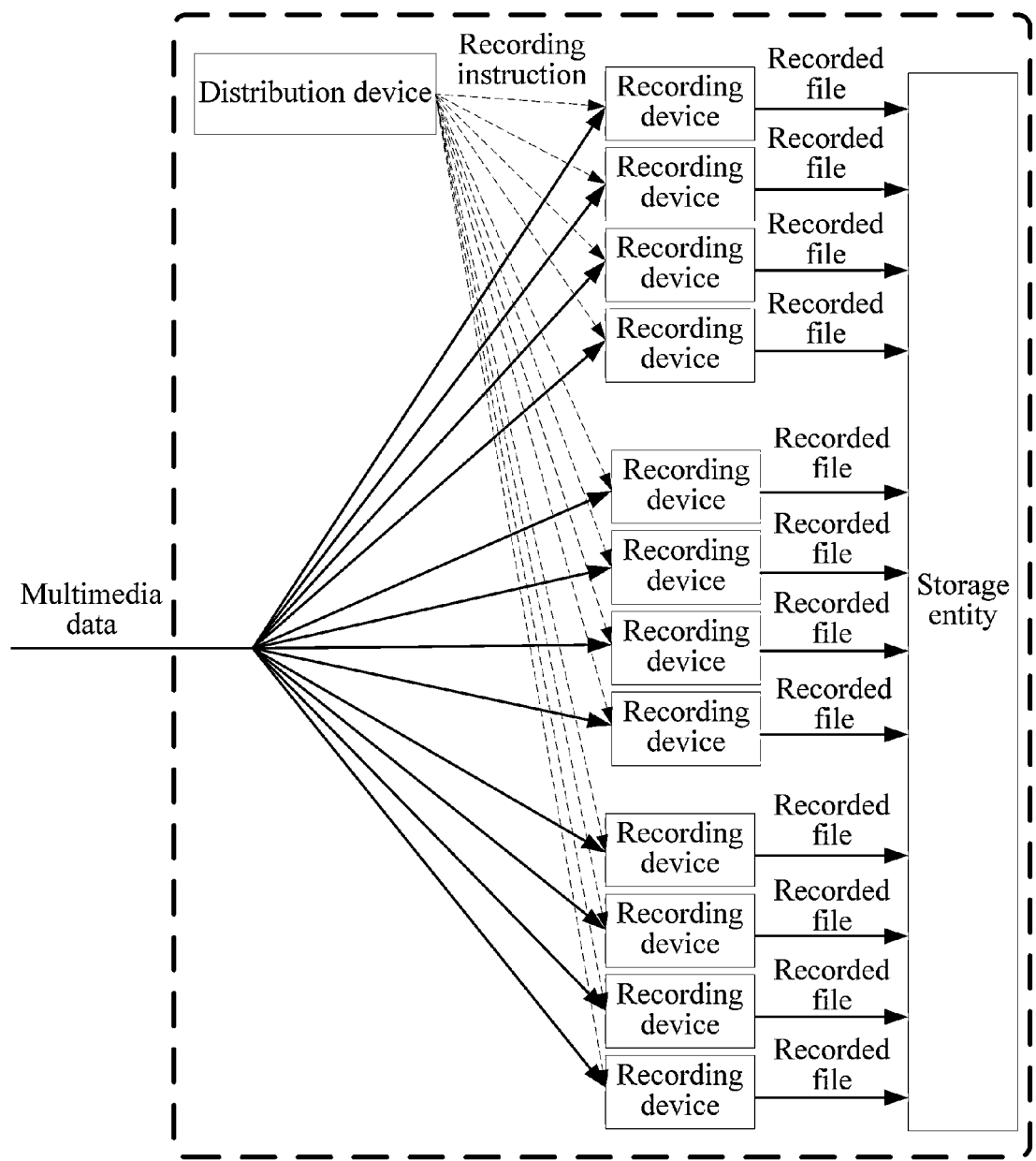
FIG. 1 is a schematic view of an architecture of a system according to an embodiment of the present invention.

As shown in FIG. 1, a recording system according to an embodiment of the present invention includes a distribution device and a recording device. The distribution device sends a recording instruction including multimedia data identification information to the recording device. The recording device identifies multimedia data corresponding to the multimedia data identification information and records the multimedia data. Optionally, the recording device may receive multimedia data and identifies, from the received multimedia data, multimedia data corresponding to the multimedia data identification information.

The distribution device may be deployed separately and may also be combined with other devices. For example, the distribution device is combined with one of the recording devices or combined with at least one device of control devices such as a computer telephony integration (CTI) device, an automatic call distribution (ACD) device, a private branch exchange (PBX), and a universal access platform (UAP).

Figure 2:
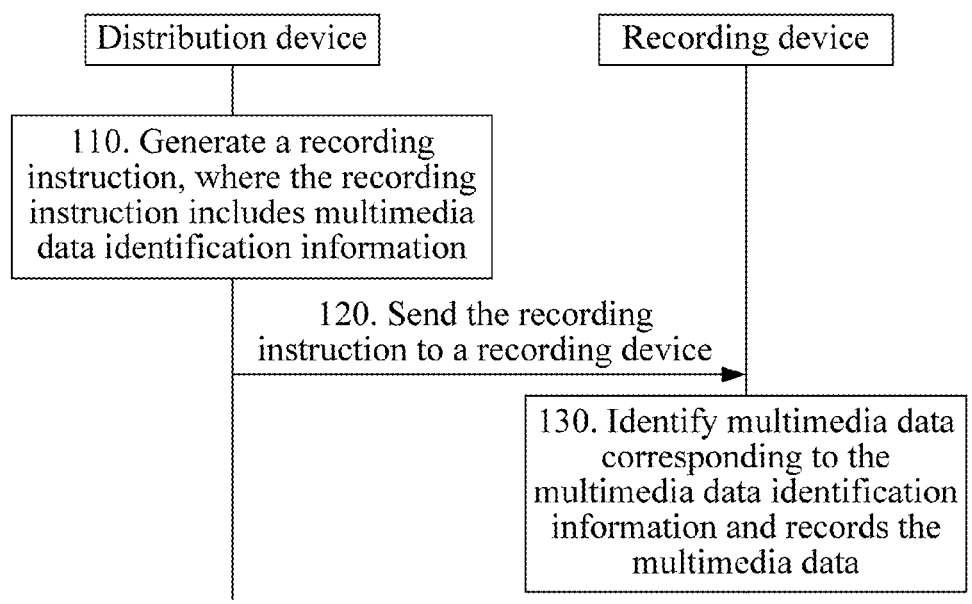
FIG. 2 is a schematic flow chart of a method according to Embodiment 1 of the present invention.

FIG. 2 is a schematic flow chart of a method for recording multimedia data according to Embodiment 1 of the present invention. The method includes:

110: A distribution device generates a recording instruction that includes multimedia data identification information. The multimedia data identification information is used for identifying multimedia data that needs to be recorded.

120: The distribution device sends the recording instruction to a recording device.

130: The recording device identifies multimedia data corresponding to the multimedia data identification information and records the multimedia data.

Specifically, the recording device receives multimedia data and identifies, from the received multimedia data, the multimedia data corresponding to the multimedia data identification information. Preferably, the recording device receives the multimedia data from a mirrored switch, and the mirrored switch is configured to mirror data packets of multimedia data transferred between two communication parties and send the mirrored data packets to the recording device.

It should be noted that, the recording instruction is used for instructing the recording device to record multimedia data corresponding to the multimedia data identification information. The recording instruction may carry an operation command for instructing the recording device to execute a recording operation. The recording instruction may also not carry a operation command. In an implementation manner where an operation command is not carried in the recording instruction, the recording device decides that a received message carrying the multimedia data identification information is from a distribution device, so the message may be considered as a recording instruction by default.

According to the embodiment of the present invention, the distribution device does not need to process and distribute all multimedia data and may only need to decide the multimedia data identification information corresponding to the multimedia data that needs to be recorded and send the multimedia data identification information to the recording device. The recording device identifies the multimedia data corresponding to the multimedia data identification information and records the multimedia data. Accordingly, the amount of data that the distribution device processes is small, thereby improving the efficiency of recording multimedia data.

In addition, since the distribution device consumes a small amount of resources, the distribution device can be combined with other devices, so as to reduce server devices and simplify networking.

The multimedia data identification information included in the recording instruction is used for identifying the multimedia data that needs to be recorded. The multimedia data may be any combination of audio data, video data, screen sharing data, image data, and text data.

The multimedia data is multimedia data transmitted between two communication parties which will be referred to as a first communication device and a second communication device in the following. Specifically, in a point-to-point communication scenario, the two communication parties may be two point-to-point communication parties, for example, an agent device and a client terminal, a UC terminal and another UC terminal, a UC terminal and a non-UC terminal, and the like. In a conference scenario, the two communication parties may be a conference terminal and a conference server, multimedia data transmitted from the conference terminal to the conference server includes audio signals or video signals of the conference terminal, and multimedia data transmitted from the conference server to the conference terminal includes mixed audio signals of the conference or video signals of other conference terminals. The multimedia data transmitted between the two communication parties may include multimedia data (hereinafter referred to as "multimedia data 1") sent by the first communication device to the second communication device and multimedia data (hereinafter referred to as "multimedia data 2") sent by the second communication device to the first communication device. Correspondingly, the multimedia data identification information may specifically include information for identifying the multimedia data 1 and information for identifying the multimedia data 2, and the information for identifying multimedia data 1 and the information for identifying the multimedia data 2 may be the same or may also be may different.

The multimedia data identification information may include an IP address, a port number, or a combination of an IP address and a port number corresponding to the multimedia data. The IP address corresponding to the multimedia data may include a source IP address of the multimedia data, a destination IP address of the multimedia data, or a source IP address and a destination IP address of the multimedia data. Multimedia data 1 and multimedia data 2 that are included in the multimedia data both have corresponding source IP addresses and destination IP addresses. The multimedia data identification information may include an IP address corresponding to multimedia data 1 and an IP address corresponding to multimedia data 2, e.g., a source IP address of multimedia data 1 and a source IP address of multimedia data 2, or further, a destination IP address of multimedia data 1 and a destination IP address of multimedia data 2. A port number corresponding to the multimedia data includes a source port number of the multimedia data, a destination port number of the multimedia data, or a source port number and a destination port number of the multimedia data. Multimedia data 1 and multimedia data 2 both have corresponding source port numbers and destination port numbers. The multimedia data identification information may include a port number corresponding to multimedia data 1 and a port number corresponding to multimedia data 2, for example, a source port number of multimedia data 1 and a source port number of multimedia data 2, or further, a destination port number of multimedia data 1 and a destination port number of multimedia data 2.

It should be noted that, if the source IP address of multimedia data 1 is the same as the destination IP address of multimedia data 2, the multimedia data identification information may only include one IP address, and the IP address may be used as the source IP address of multimedia data 1 and also as the destination IP address of multimedia data 2. If the source port number of multimedia data 1 is the same as the destination port number of multimedia data 2, the multimedia data identification information may only include one port number, and the port number may be used as the source port number of multimedia data 1 and also as the destination port number of multimedia data 2.

Preferably, the recording instruction may further carry information for denoting whether the IP address or port number is a source IP address or a source port number or is a destination IP address or a destination port number.

The recording instruction may carry identification information of one or more pieces of multimedia data. An example of identification information of one piece of multimedia data is as follows:

Example 1 multimedia1: des(destination), IP address 1, port number 1 multimedia2: des(destination), IP address 2, port number 2

Example 2 multimedia1: des(destination), IP address 1, port number 1 multimedia2: sour(source), IP address 1, port number 1

Example 3

IP address 1, port number 1

Example 4 multimedia1: sour(source), IP address 1, port number 1; des(destination), IP address 2, port number 2 multimedia2: sour(source), IP address 3, port number 3; des(destination), IP address 4, port number 4

Example 5 multimedia1: IP address 1, port number 1
multimedia2: IP address 2, port number 2.

In the foregoing examples, the multimedia data identification information includes both an IP address and a port number. Similarly, the multimedia data identification information also can be an IP address or a port number.

It should be noted that, if the multimedia data includes audio and video, the multimedia data identification information of the audio and the multimedia data identification information of the video might be the same or might be different. If they are different and the recording device needs to record audio and video at the same time, the multimedia data identification information includes the identification information of the audio (e.g., a destination IP address and a destination port number of the audio) and identification information of the video (e.g., a destination IP address and a destination port number of the video).

The multimedia data identification information may further specifically include a call identifier corresponding to multimedia data that needs to be recorded. The call identifier corresponding to the multimedia data may be a call identifier included in a signaling for establishing a channel for transmitting the multimedia data. Call identifiers corresponding to multimedia data 1 and multimedia data 2 that are included in the multimedia data may be the same.

Optionally, the recording instruction may further include a data type of the multimedia data that needs to be recorded, for example, one or more of data types such as an audio data type, a video data type, a screen sharing data type, an image data type, a text data type, which is used for instructing the recording device to record multimedia data corresponding to a designated multimedia data type. For example, for a video call communication, it may be designated to record audio data transmitted during the communication only and not to record video data.

Three exemplary implementation manners of Embodiment 1 of the present invention are introduced in the following.

Exemplary implementation manner A: A distribution device generates a recording instruction according to received signaling.

110A: The distribution device receives the signaling and generates a recording instruction according to the signaling, where the signaling is a signaling for establishing a channel for transmitting the multimedia data.

The signaling may specifically be received from a mirrored switch and may also be received from a control device (for example, CTI).

The signaling includes multimedia data identification information. The distribution device may specifically obtain the multimedia data identification information according to the signaling, and generate the recording instruction including the multimedia data identification information. The distribution device may further use the signaling (for example, a call request signaling) as the recording instruction. For example, the distribution device directly uses the signaling as the recording instruction, or deletes a part or all of information other than the multimedia data identification information in the signaling and uses the signaling as the recording instruction.

If the data received by the distribution device includes signaling and multimedia data, the distribution device detects the signaling from the data before generating the recording instruction according to the signaling.

The signaling may specifically be SIP signaling, H.323 signaling, H.248 signaling, and so on. In the following a SIP signaling is taken as an example to illustrate in detail an exemplary implementation manner of obtaining multimedia data identification information from the signaling:

Exemplary implementation manner 1: Obtain, from the signaling, a call identifier corresponding to the multimedia data and use the call identifier as multimedia data identification information in the recording instruction.

Specifically, a call identifier is obtained from a call identifier header field of the signaling. If the signaling is a SIP signaling, then a Call-ID is obtained from a Call-ID header field of the signaling, the Call-ID is the call identifier. The call identifier may be obtained from any type of signaling, or the call identifier may be obtained from a specific type of signaling, for example, from a signaling such as call request signaling INVITE, successful response signaling 200 OK and successful response acknowledgment signaling ACK. By taking the INVITE signaling as an example, as shown in FIG. 3-1, a call identifier may be obtained from a Call-ID header field of the INVITE signaling.

Exemplary implementation manner 2: Obtain, from the signaling, an IP address or a port number corresponding to multimedia data, and use the IP address or the port number as the multimedia data identification information.

Specifically it may include that a destination IP address or a destination port number or a destination IP address and a destination port number of multimedia data 2 is obtained from at least one piece of signaling sent from a first communication device to a second communication device in the signaling, and a destination IP address or a destination port number or a destination IP address and a destination port number of multimedia data 1 is obtained from at least one piece of signaling sent from the second communication device to the first communication device.

Preferably, the signaling includes session description protocol (SDP) information and the IP address is obtained from a connection information field (namely, line "c=") of the SDP information, or the port number is obtained from a media name and transport address field (namely, line "m=") of the SDP information, or the IP address is obtained from a connection information field of the SDP information and the port number is obtained from a media name and transport address field of the SDP information.

If the source IP address of multimedia data 1 is the same as the destination IP address of multimedia data 2, or the source port number of multimedia data 1 is the same as the destination port number of multimedia data 2, the destination IP address or destination port number of multimedia data 2 may also be obtained from at least one piece of signaling sent from the first communication device to the second communication device.

In an actual communication scenario, the first communication device and the second communication device are a calling device and a called device, respectively. Specifically, a call request signaling (for example, SIP INVITE signaling) sent by the calling device to the called device may be parsed to obtain an IP address or a port number which is used by the calling device to receive multimedia data sent by the called device. A temporary response signaling (for example, SIP 183 signaling, SIP 180 signaling) or a successful response signaling (for example, SIP 200 OK signaling) sent by the called device to the calling device may also be parsed to obtain an IP address or a port number which is used by the called device to receive multimedia data sent by the calling device.

FIG. 3-1 shows an example of INVITE signaling. 1086@192.167.1.248 (hereinafter referred to as "1086") calls 8000@192.162.1.29 (hereinafter referred to as "8000"), sends a SIP INVITE signaling to 8000. a related parameter which is used by 1086 to receive the multimedia data sent by 800, for example, a destination IP address (192.167.1.248) of the multimedia data and a destination port number (10574) of the multimedia data, may be obtained from the INVITE signaling.

FIG. 3-2 shows an example of a SIP 200 OK message body, which is SIP 200 OK signaling returned to 8000 when a user corresponding to 1086 pick up a phone. A related parameter which is used by 8000 to receive the multimedia data sent by 1086, for example, a destination IP address (192.162.1.29) of the multimedia data and a destination port number (11798) of the multimedia data, may be obtained from the 200 OK signaling.

Preferably, the call identifier may be obtained from a certain type of signaling (for example, INVITE signaling), the call identifier is used to search the received SIP signaling to obtain other SIP signaling including the call identifier, a signaling including SDP information is then decided from the signalings having the same call identifier, and an IP address or a port number is obtained from the SDP information of the decided signaling.

Preferably, before the generating the recording instruction according to the signaling, the method further includes: determining whether the signaling satisfies a preset first recording policy. If yes, generating the recording instruction according to the signaling, where the first recording policy is used for deciding signaling corresponding to multimedia data that needs to be recorded.

The determining whether the signaling satisfies a preset first recording policy specifically includes: determining whether the signaling includes a calling number or a called number which is matched with a preset recording number, where the recording number is specifically a number (for example, telephone number) of a communication device corresponding to the multimedia data that needs to be recorded. One or more preset recording numbers may exist, and the set of one or more recording numbers is referred to as a a recording number set; or, determining whether the signaling includes an IP address that is matched with a preset IP address, may specifically be determining whether an IP address of a from header field value or a to header field value or a connection information field of SDP information of the signaling is matched with a preset IP address, and the preset IP address specifically includes an IP address of the multimedia data that needs to be recorded. It should be noted that, because the signalings including the same call identifier include the same calling number and called number, the determining whether the signaling includes a calling number or a called number that is matched with a preset recording number may be specifically: determining whether the signaling includes the obtained call identifier, and the obtained call identifier means a call identifier obtained by parsing the signaling including a calling number or called number that is matched with a preset recording number.

In an IPCC scenario, the recording number set is preferably formulated according to an IPCC agent number (e.g., telephone number of a agent), which may be specifically generated according to a set of agent IDs needed to record and a correspondence between an agent ID and an agent number. The set of agent IDs needed to record denotes that only communication-related multimedia data of agents corresponding to agent IDs in the set of agent IDs needed to record are recorded. In an actual IPCC application scenario, an agent may register with a control device such as a CTI, ACD, PBX, and UAP, where the control device such as a CTI, ACD, PBX, and UAP may set the set of agent IDs needed to record, and in the following only the CTI is taken as an example for detailed illustration. When an agent logs in to a CTI, the CTI records the correspondence between the agent ID and the agent number. Correspondingly, the foregoing exemplary implementation manner of generating a latest recording number set through the set of agent IDs needed to record and the correspondence between the agent ID and the agent number is as follows: for example, a CTI generates a recording number set through the set of agent IDs needed to record and a table of the correspondence between the agent ID and the agent number, and sends the recording number set to the distribution device. If a change occurs on the set of agent IDs needed to be recorded (for example, the registration of a new agent ID that needs to be recorded (i.e., the new agent ID is added to the set of agent IDs needed to record)) or a change occurs on the table of the correspondence between the agent ID and the agent number (for example, an agent logs in to a CTI, or an agent logs out from a CTI), the recording number set is updated correspondingly, and the updated recording number set is sent to the distribution device. Further, for example, a CTI sends the set of agent IDs needed to record and the table of the correspondence between the agent ID and the agent number to the distribution device and the distribution device generates a recording number set, and if a change occurs on the set of agent IDs needed to record or the table of the correspondence between the agent ID and the agent number, correspondingly, the latest set of agent IDs needed to record or the latest table of the correspondence is sent to the distribution device and the distribution device updates the recording number set, or only the updated agent IDs needed to record or correspondence may also be sent to the distribution device and the distribution device updates the recording number set. Optionally, the recording number set may also be preconfigured on the distribution device.

The distribution device may further generate the recording instruction according to recording instruction information, which may specifically include: first, recording a recording parameter such as multimedia data identification information and a multimedia data type etc; obtaining the recording instruction information that instructs recording the multimedia data, and then generating the recording instruction including the recording parameter. The method of obtaining the recording instruction information may include: obtaining the recording instruction information from a signaling (which may be specifically SIP INFO signaling) that has the same call identifier as the signaling; after the recording instruction information is obtained, deciding the recorded recording parameter corresponding to the recording instruction information, and generating a recording instruction including the recording parameter (for example, multimedia data identification information). The manner of deciding the recorded recording parameter corresponding to the recording instruction information may include: deciding the recording parameter according to the parameter included in the SIP INFO; for example, the multimedia data identification information included in the recorded recording parameter is a Call-ID, thus the recorded recording parameter may be matched according to the Call-ID included in the SIP INFO. Further, for example, the multimedia data identification information included in the recorded recording parameter is not a Call-ID but at the same time correspondence between a recording parameter and a Call-ID is recorded, thus the recorded recording parameter may be matched according to the Call-ID included in the SIP INFO and the recorded correspondence between the recording parameter and the Call-ID. In addition, the distribution device may further obtain the recording instruction information, then obtain a recording parameter of the multimedia data corresponding to the call, and generate the recording instruction including the recording parameter.

By adopting the manner of generating a recording instruction according to recording instruction information, it may be implemented that multimedia data of communication is recorded only when a user instructs so, which fully respects a recording intention of a user and is particularly applicable to a UC scenario.

Preferably, the distribution device detects a signaling denoting that a communication corresponding to the recording instruction is successfully established (for example, SIP 200 OK, SIP ACK) and sends the recording instruction. By adopting this implementation manner, it may be avoided that the multimedia data transmitted before the communication is established (for example, a multimedia color ring back tone data) is recorded, thereby ensuring that recorded multimedia data is multimedia data transmitted between two communication parties.

120A: The distribution device sends the recording instruction to a recording device.

Specifically, a recording device that needs to record multimedia data corresponding to the multimedia data identification information may be decided first, and then the recording instruction is sent to the decided recording device.

The method of deciding the recording device may be specifically deciding the recording device according to a preset second recording policy. The second recording policy may include a policy of deciding a recording device based on a load balance. For example, multimedia data of 3000 paths of communication are evenly distributed to 12 recording devices for recording. Further, for example, in a scenario where each recording device is different in hardware performance, for example, some are new model devices with high performance, which may support 500 paths, whereas some are old model servers with low performance, which may support 200 paths, a corresponding load balance may be reached according to the capability specification of each device. The second recording policy may include a policy of deciding a recording device based on the feature of multimedia data identification information. For example, communication devices corresponding to multimedia data, which needs to be recorded and is distributed to one same recording device, should better be associated in logical locations in the network deployment. The IP addresses corresponding to multimedia data, which needs to be recorded and is distributed to one same recording device, should better be continuous, or the port numbers corresponding to multimedia data, which needs to be recorded and is distributed to one same recording device, should better be continuous. For example, it is assumed there are 2400 users, and IP addresses corresponding to multimedia data transmitted by communication devices of the users are distributed at x.x.1.10-x.x.11.250, so multimedia data of 250 paths of communication corresponding to an IP address range x.x.1.10-x.x.2.20 may be distributed to one same recording device for recording. The second recording policy may further include a policy of deciding a recording device according to set correspondence between a recording device and a recording number set. For example, recording device 1 records multimedia data corresponding to a number included in recording number set 1. In specific implementation, the second recording policy may include one or more of various recording policies (for example, the above three recording policies).

A recording device for recording multimedia data may be not decided. Instead the recording instruction is directly sent to all recording devices that communicate with the distribution device, and each recording device decides whether the multimedia data corresponding to multimedia data identification information included in the recording instruction is the multimedia data that the recording device needs to record. Optimally, before the recording instruction is sent, it may further include: sending, to each recording device, the multimedia data identification information set that the recording device needs to record.

In addition, the distribution device may first generate the recording instruction, obtain an instruction of a user, and then send the recording instruction to the recording device. The method of obtaining the instruction of the user is as described in step 110A. By adopting the manner of obtaining an instruction of a user and then sending a recording instruction to a recording device, it may be implemented that multimedia data of communication is only recorded when a user instructs so, which may fully respect a recording intention of a user and is particularly applicable to a UC scenario.

130A: The recording device, after receiving the recording instruction, identifies multimedia data corresponding to the multimedia data identification information included in the recording instruction and records the multimedia data.

Optionally, the recording device may receive multimedia data and identifies, from the received multimedia data, the multimedia data corresponding to the multimedia data identification information. Optimally, the recording device receives the multimedia data from the mirrored switch. It should be noted that the multimedia data received by the recording device is encapsulated in a received data packet.

The identifying the multimedia data corresponding to the multimedia data identification information may specifically include: determining whether a received data packet includes the multimedia data identification information. If yes, deciding that data included in the data packet is multimedia data corresponding to the multimedia data identification information.

Specifically, as the multimedia data identification information specifically includes an IP address, the recording device determines whether a destination IP address or a source IP address in a received data packet is the IP address included in the recording instruction, and if a determination result is yes, decides that data included in the data packet is the multimedia data that needs to be recorded. As the multimedia data identification information specifically includes a port number, the recording device may determine whether a destination port number or a source port number in a received data packet is the port number included in the recording instruction. If the determination result is yes, the recording device decides that data contained in the data packet is the multimedia data that needs to be recorded. As the multimedia data identification information includes an IP address and a port number, the recording device may determine whether a destination IP address and a destination port number in a received data packet are the IP address and the port number that are included in the recording instruction. If the determination result is yes, the recording device decides that data included in the data packet is the multimedia data that needs to be recorded.

The multimedia data identification information may also specifically includes an IP address and a port number, the recording device determines whether a source IP address and a source port number in a received data packet are the IP address and the port number that are included in the recording instruction, and if the determination result is yes, decides that data included in the data packet is the multimedia data that needs to be recorded.

Figures 1, 4:
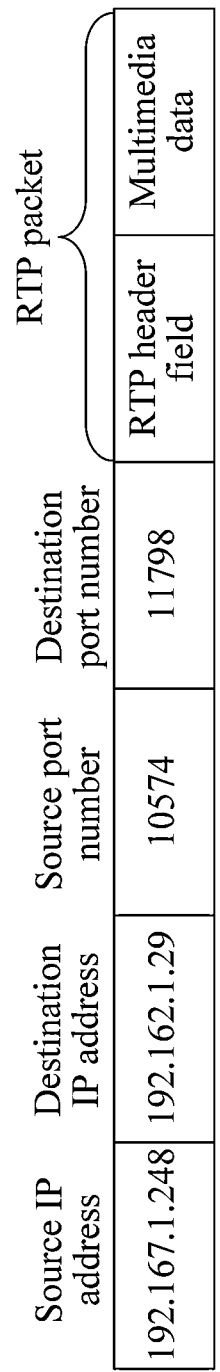
Figures 2, 4:
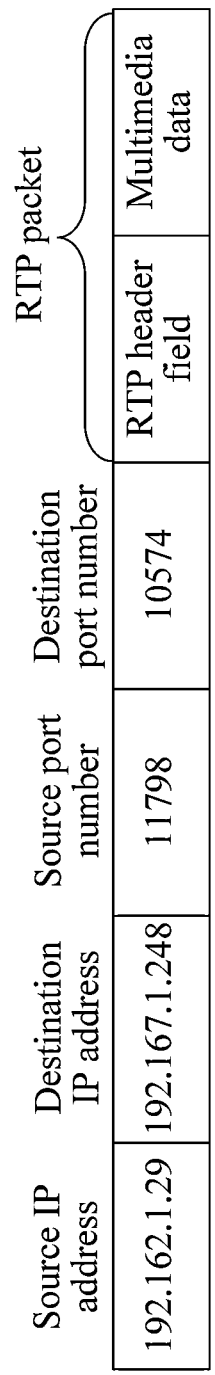

In the following an example in which an IP packet with its data packet encapsulating an RTP packet is taken to illustrate in detail an exemplary implementation manner of identifying, from received multimedia data, multimedia data corresponding to multimedia data identification information:

FIG. 4-1 shows an IP packet encapsulating an RTP packet sent by 10086 to 8000, and FIG. 4-2 shows an IP packet encapsulating an RTP packet sent by 8000 to 10086. It should be noted that, FIG. 4-1 and FIG. 4-2 only show a source IP address, a destination IP address, a source port number, and a destination port number in an IP packet but other fields in this IP packet are omitted.

The IP packets in FIG. 4-1 and FIG. 4-2 are taken as examples for the following description. In the following examples, an example of an IP address and a port number is taken for the multimedia data identification information, and the IP address and the port number in the following examples may also be replaced by an IP address or a port number.

Example 1

Multimedia data identification information in a recording instruction includes a destination IP address and a destination port number of multimedia data 1 and a destination IP address and a destination port number of multimedia data 2, which are as follows:

Multimedia1: des(destination), 192.162.1.29, 11798
Multimedia2: des(destination), 192.167.1.248, 10574.

By comparing the destination IP address and the destination port number that are included in the multimedia data identification information with a destination IP address and a destination port number in the IP packet, it may be decided that the multimedia data in the IP packet shown in FIG. 4-1 and the multimedia data in the IP packet shown in FIG. 4-2 are both multimedia data that needs to be recorded, and it may be decided that the IP packet shown in FIG. 4-1 is a data packet corresponding to multimedia data 1, whereas the IP packet shown in FIG. 4-2 is a data packet corresponding to multimedia data 2.

It should be noted that in Example 1, information for denoting that the IP address and information that the port number is a source IP address and a source port number or a destination IP address and a destination port number (for example, des in the example) may be not carried in the recording instruction. The recording device may directly match the IP address and the port number, which are carried in the recording instruction, with the source IP address and the source port number in the IP packet (in FIG. 4-1 or FIG. 4-2) or with the destination IP address and the destination port number in the IP packet (in FIG. 4-1 or FIG. 4-2). If a match exists, it is decided that the multimedia data in the IP packet is the multimedia data that needs to be recorded.

Example 2

Multimedia data identification information in a recording instruction includes a destination IP address and a destination port number of multimedia data 1 and a source IP address and a source port number of multimedia data 2, which are as follows:

Multimedia1: des(destination), 192.162.1.29, 11798
Multimedia2: sour(source), 192.162.1.29, 11798.

By comparing the destination IP address and the destination port number that are included in the multimedia data identification information with a destination IP address and a destination port number in an IP packet, it may be decided that the multimedia data in the IP packet shown in FIG. 4-1 is multimedia data that needs to be recorded, and it may be decided that the IP packet shown in FIG. 4-1 is a data packet corresponding to multimedia data 1; by comparing the source IP address and the source port number that are included in the multimedia data identification information with a source IP address and a source port number in an IP packet, it may be decided that the multimedia data in the IP packet shown in FIG. 4-2 is multimedia data that needs to be recorded, and it may be decided that the IP packet shown in FIG. 4-2 is a data packet corresponding to multimedia data 2.

Example 3

Multimedia data identification information in a recording instruction includes an IP address and a port number of multimedia data, and the IP address and the port number are both used as a destination IP address and a destination port number of multimedia data 1 and used as a source IP address and a source port number of multimedia data 2:

192.162.1.29, 11798

By using the IP address and the port number, which are included in the multimedia data identification information, as the destination IP address and the destination port number to compare the destination IP address and the destination port number with a destination IP address and a destination port number in an IP packet, it may be decided that the multimedia data in the IP packet shown in FIG. 4-1 is multimedia data that needs to be recorded, and it may be decided that the IP packet shown in FIG. 4-1 is a data packet corresponding to multimedia data 1; by using the IP address and the port number, which are included in the multimedia data identification information, as the source IP address and the source port number to compare the source IP address and the source port number with a source IP address and a source port number in an IP packet, it may be decided that the multimedia data in the IP packet shown in FIG. 4-2 is multimedia data that needs to be recorded, and it may be decided that the IP packet shown in FIG. 4-2 is a data packet corresponding to multimedia data 2.

Example 4

Multimedia data identification information in a recording instruction includes a source IP address and a source port number of multimedia data 1 and a destination IP address and a destination port number of multimedia data 1, and further includes a source IP address and a source port number of multimedia data 2 and a destination IP address and a destination port number of multimedia data 2:

Multimedia1: sour(source), 192.167.1.248, 10574; des(destination), 192.162.1.29, 11798
Multimedia2: sour(source), 192.162.1.29, 11798; des(destination), 192.167.1.248, 10574

By comparing the source IP address and the source port number, the destination IP address and the destination port number of Multimedia1 included in the multimedia data identification information with a source IP address and a source port number, a destination IP address and a destination port number in an IP packet, it may be decided that the multimedia data in the IP packet shown in FIG. 4-1 is multimedia data that needs to be recorded, and it may be decided that the IP packet shown in FIG. 4-1 is a data packet corresponding to multimedia data 1; and by comparing the source IP address and the source port number, the destination IP address and the destination port number of Multimedia2 included in multimedia data identification information with a source IP address and a source port number, a destination IP address and a destination port number in an IP packet, it may be decided that the multimedia data in the IP packet shown in FIG. 4-2 is multimedia data that needs to be recorded, and it may be decided that the IP packet shown in FIG. 4-2 is a data packet corresponding to multimedia data 2.

In addition, a call identifier field may be extended in the data packet so as to carry a call identifier (for example, Call-ID) corresponding to the data packet. For example, a Call-ID field is extended in an RTP packet header field. If the multimedia data identification information is a call identifier (for example, Call-ID), correspondingly, the identifying the multimedia data corresponding to the multimedia data identification information may further specifically include: determining whether a received data packet includes the call identifier. If yes, deciding that data included in the data packet is the multimedia data that needs to be recorded. Specifically, the data packet corresponding to multimedia data 1 and the data packet corresponding to multimedia data 2 may further be decided in combination with the information for distinguishing multimedia data 1 from multimedia data 2 in the data packet.

The data received by the recording device may include signaling and multimedia data. Optionally, if the multimedia data identification information included in the recording instruction is a call identifier, the recording device may obtain a signaling including the call identifier according to the call identifier (for example, find signaling including the call identifier from the received signaling through matching), obtain an IP address from the obtained signaling, determine whether a destination IP address or a source IP address in a received data packet is the obtained IP address. If the determination result is yes, the recording device decides that data included in the data packet is the multimedia data that needs to be recorded. Alternatively, the recording device may obtain a port number from the obtained signaling, determine whether a destination port number or a source port number in the received data packet is the obtained port number. If the determination result is yes, the recording device decides that data included in the data packet is the multimedia data that needs to be recorded. Alternatively, the recording device may obtain an IP address and a port number from the obtained signaling, determine whether a destination IP address and a destination port number in the received data packet are the obtained IP address and port number. If the determination result is yes, the recording device decides that data included in the data packet is the multimedia data that needs to be recorded. Alternatively, the recording device may obtain an IP address and a port number from the obtained signaling, determine whether a source IP address and a source port number in the received data packet are the obtained IP address and port number. If the determination result is yes, the recording device decides that data included in the data packet is the multimedia data that needs to be recorded. It should be noted that the method for obtaining an IP address or a port number from the matched signaling is the same as that described in step 110A.

If recorded data includes multimedia data 1 and multimedia data 2, and both multimedia data 1 and multimedia data 2 include audio, preferably, the recording device mixes the audio included in multimedia data 1 and the audio included in multimedia data 2 and records and stores mixed audio.

Preferably, if the recording instruction further includes the type of the multimedia data that needs to be recorded, for example, audio or video, the recording device may decide the multimedia data that needs to be recorded according to the type of multimedia data carried in the data packet.

Preferably, the recording device may also screen the received data packet to acquire a data packet which might be recorded, and then identify, from the data packet that is acquired through screening, a data packet corresponding to the multimedia data identification information included in the recording instruction, where the multimedia data identification information set is preconfigured or obtained from the distribution device, or generated according to the multimedia data identification information included in a previously received recording instruction. Preferably, if the recording device receives data that includes signaling and multimedia data, specifically, the recording device may detect a data packet from the received data, screen the detected data packet to acquire the data packet corresponding to a multimedia data identification information set, and identify, from the data packet that is acquired through screening, the data packet corresponding to the multimedia data identification information included in the recording instruction.

The screening operation may, specifically, be performed according to a locally stored multimedia data identification information set, and the multimedia data identification information set may be an IP address set (for example, an IP address range) or a port number set (for example, a port number range) or an IP address set and a port number set. The IP address range or the port number range may specifically be a completely continuous range or may also be a partially continuous range; by taking an IP address range as an example, the example of a completely continuous IP address range is x.x.1.10-x.x.2.20, and the example of a partially continuous IP address range is x.x.1.10-x.x.1.120 and x.x.1.120-x.x.2.20. The multimedia data identification information set may be received from the distribution device and may also be generated according to the multimedia data identification information included in the recording instruction sent by the distribution device. For example, multimedia data identification information, which the recording device needs to record and is included in the received recording instruction, is recorded to form a multimedia data identification information set. Because the multimedia data identification information included in the multimedia data identification information set is not completely discrete, instead completely continuous or partially continuous (e.g., these pieces of multimedia data identification information are logically related), the multimedia data identification information set may be denoted by a logic expression of a continuous range (such as the port numbers 10000-10030 or the IP addresses x.x.10.10-x.x.11.70) to rapidly perform comparison and perform screening to acquire media that might need to be recorded. The screening may be based on other screening conditions, such as a data packet type (for example, only audio data is recorded).

It should be noted that, if the recording device receives data that includes signaling and multimedia data (the received data packet includes a data packet encapsulating signaling and a data packet encapsulating multimedia data), before the recording device identifies, from the received multimedia data, the multimedia data corresponding to the multimedia data identification information included in the recording instruction, the method may further include: detecting multimedia data from the data, (i.e., detecting, from the received data packet, a data packet encapsulating the multimedia data).

Preferably, the recording device may further cache the received data packet, and screen the cached data packet to acquire a data packet which might be recorded. Specifically, an exemplary implementation manner is as follows: first, the recording device caches a received data packet (for example, caching in a real-time first in, first out manner), and then executes a real-time comparison screening operation. As long as a data packet does not conform to the logic expression of a multimedia data identification information set, the recording device discards the data packet in real time. If a data packet conforms to the logic expression, the recording device performs the screening to acquire the data packet.

It should be noted that, if the recording device receives data that includes signaling and multimedia data (i.e., the received data packet includes a data packet encapsulating signaling and a data packet encapsulating multimedia data), the received data packet is cached in real time, the data packet encapsulating multimedia data is detected from the cached data packet, and a data packet corresponding to a multimedia data identification information set is acquired through screening the detected data packet encapsulating multimedia data.

The multimedia data is cached in real time and a data packet including multimedia data that might need to be recorded is acquired through screening, through real-time comparison according to a logic expression, to subsequently identify, from the data packet that is acquired through screening for recording, a data packet including multimedia data that needs to be recorded, which may handle large real-time network traffic, thereby further improving efficiency of a recording device.

Optionally, if the distribution device directly sends the recording instruction to all recording devices that communicate with the distribution device, each recording device needs to decide whether multimedia data corresponding to multimedia data identification information included in the recording instruction is multimedia data that the recording device needs to record. Specifically, each of the recording device makes a decision according to the multimedia data identification information set. For example, if the multimedia data identification information included in the recording instruction is a multimedia data identification information set, it is decided that the multimedia data corresponding to the multimedia data identification information is multimedia data that the recording device needs to record.

Preferably, the distribution device and the recording device receive the same data which includes signaling and multimedia data. The data may be mirrored data received from a mirrored switch.

Figure 5:
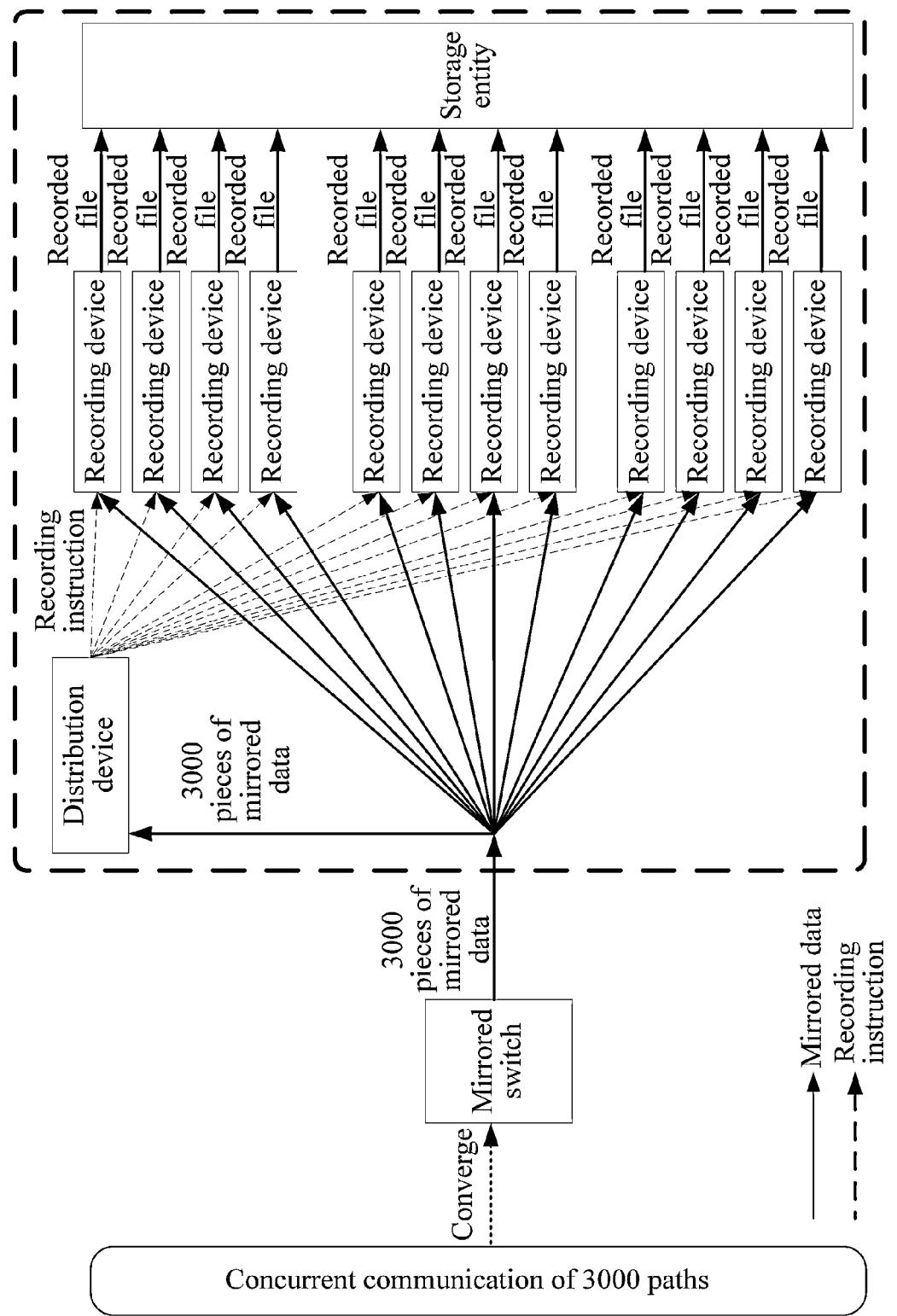
FIG. 5 is a schematic view of an exemplary implementation according to Embodiment 1 of the present invention.

FIG. 5 shows an exemplary implementation manner of exemplary implementation manner A.

A mirrored switch sends converged mirrored data (3000 pieces of mirrored data as shown in FIG. 5) to a distribution device and each recording device separately, and the mirrored data includes signaling and multimedia data.

After receiving the mirrored data, the distribution device generates a recording instruction including multimedia data identification information according to the signaling included in the mirrored data, and instructs a recording device, which needs to record multimedia data corresponding to the multimedia data identification information, to record the multimedia data.

After receiving the mirrored data, the recording device identifies the multimedia data from the multimedia data included in the received mirrored data according to the multimedia data identification information included in the received recording instruction and records the multimedia data. The recorded file may be stored on the recording device or may also be stored on a storage device that communicates with the recording device.

According to this exemplary implementation manner, an automatic recording of multimedia data may be implemented in a large-capacity office scenario. As long as communication related data is converged to one port and mirrored to a distribution device of a recording system, the recording system can completes recording of multimedia data independently and effectively.

In actual deployment, communication related data of an extra-large-capacity office may be converged and mirrored through multiple ports separately and the communication multimedia data mirrored from each port is recorded, separately.

According to exemplary implementation manner A in Embodiment 1 of the present invention, the distribution device does not need to process and distribute multimedia data and the distribution device only needs to process the received signaling, decide, according to the signaling, the multimedia data identification information corresponding to the multimedia data that needs to be recorded, and send the multimedia data identification information to the recording device. The recording device identifies the multimedia data corresponding to the multimedia data identification information and records the multimedia data, so that the amount of data that the distribution device processes is small. Consuming a small amount of resources does not cause a performance bottleneck, thereby improving the efficiency of recording multimedia data.

An exemplary implementation manner B will be described. In this implementation manner, the distribution device generates a recording instruction according to obtained multimedia data identification information.

110B: The distribution device receives multimedia data identification information from a control device, and generates a recording instruction including the multimedia data identification information.

Specifically, the control device obtains the multimedia data identification information from the received signaling and sends the obtained multimedia data identification information to the distribution device, and the distribution device generates the recording instruction including the multimedia data identification information. The control device may further obtain, from the signaling, a calling number or a called number corresponding to the multimedia data identification information and send the calling number or the called number to the distribution device, and the distribution device determines whether the calling number or the called number is matched with a preset recording number, and if yes, generates the recording instruction including the multimedia data identification information.

120B: Similar to step 120A, which is not described here; and

130B: Similar to step 130A, which is not described here.

In exemplary implementation manner B, the control device parses a signaling to obtain the multimedia data identification information and sends the multimedia data identification information to the distribution device for generating a recording instruction, and the distribution device does not need to receive and parse the signaling, thereby further reducing a processing load of the distribution device and further improving efficiency of recording multimedia data.

It should be noted that, exemplary implementation manner B mainly focus on a case where the distribution device and the control device cooperate together.

In actual applications, the recording instruction may further include communication related description information corresponding to the multimedia data identification information, which includes, but is not limited to: the numbers of two communication parties, an ID of an agent, identity information of a client, data type interaction information during communication between an agent and a client, recording value information, evaluation information, so that the description information is recorded for subsequent use while the recording device records multimedia data. In exemplary implementation manner A, the description information may specifically be obtained through parsing the signaling by the distribution device. In exemplary implementation manner B, the description information may be specifically obtained through parsing received signaling by the control device and sent to the distribution device.

Exemplary implementation manner C: A distribution device generates a recording instruction according to a preset third recording policy.

110C: The distribution device generates a recording instruction according to a preset third recording policy, where the third recording policy is used for deciding multimedia data identification information of multimedia data that each recording device needs to record.

Specifically, user identity information corresponding to each recording device is preset, and a correspondence between the user identity information and multimedia data identification information (for example, an IP address or a port number or an IP address and a port number) is preset, where the user identity information may specifically be a telephone number (for example, a telephone number of a UC user, a telephone number of an agent), an ID of an agent, and the like. The distribution device obtains the preset user identity information corresponding to each recording device, respectively, further obtains multimedia data identification information corresponding to the user identity information, and generates the recording instruction including the multimedia data identification information.

Specifically, multimedia data identification information corresponding to each recording device is preset, and the distribution device obtains the preset multimedia data identification information corresponding to each recording device, and generates the recording instruction including the multimedia data identification information.

The generating the recording instruction including the multimedia data identification information may be specifically: generating a recording instruction for each recording device, respectively, and placing multimedia data identification information corresponding to each obtained recording device into the recording instruction generated for the recording device, respectively; may further be specifically: generating a same recording instruction for all recording devices that communicate with the distribution device, placing multimedia data identification information corresponding to each obtained recording device in the recording instruction, and the correspondence between the recording device and the multimedia data identification information corresponding to the recording device is carried in the recording instruction.

120C: The distribution device sends the recording instruction to the recording device.

Specifically, if in step 110C one recording instruction is generated for each recording device, respectively, the recording instruction generated for each recording device is sent to the device, respectively. If in step 110C the same recording instruction is generated for all recording devices that communicate with the distribution device, the recording instruction is sent to all the recording devices.

130C: After receiving the recording instruction, the recording device identifies, from the received multimedia data, multimedia data corresponding to the multimedia data identification information included in the recording instruction and records the identified multimedia data.

If the recording instruction includes the correspondence between the recording device and the multimedia data identification information corresponding to the recording device, the multimedia data identification information corresponding to the recording device is first decided according to the correspondence, and then the decided multimedia data corresponding to the multimedia data identification information is identified from the received multimedia data, and the identified multimedia data is recorded.

For the specific implementation of the identification operation and the recording operation, reference may be made to step 130A.

In exemplary implementation manner C, the distribution device does not need to parse the signaling, instead directly sends the identification information of multimedia data, which each recording device needs to record currently, to each recording device according to the second recording policy, separately. By adopting the implementation manner, the processing efficiency of the distribution device is high and the implementation cost is low.

It should be noted that, in Embodiment 1 of the present invention, the distribution device may further send recording additional information to the recording device, where the recording additional information may include information for instructing a recording manner. For example, for recording of video multimedia data, videos may be recorded by different levels according to resolutions and the like. For example, videos lower than standard definition are entirely recorded, and high-definition videos are recorded partially (64 frames in every 256 multimedia data frames are recorded). The recording additional information may be carried in a recording instruction, and may also be sent through instructions other than the recording instruction.

According to Embodiment 1 of the present invention, Embodiment 2 of the present invention provides a distribution device for recording multimedia data 100.

Figure 6:
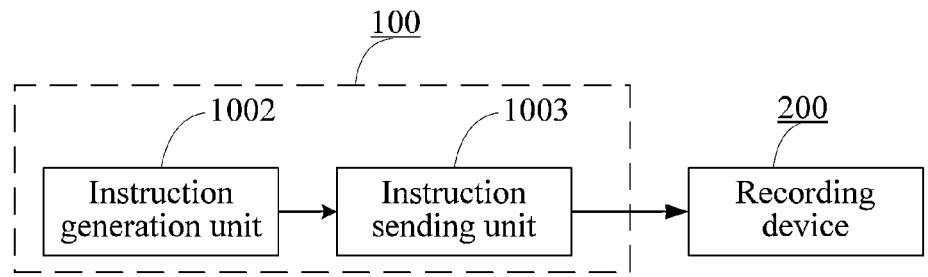
FIG. 6 is a schematic structural view of a device according to Embodiment 2 of the present invention.

As shown in FIG. 6, the distribution device for recording multimedia data 100 may include:

an instruction generation unit 1002, configured to generate a recording instruction, where the recording instruction includes multimedia data identification information, and the multimedia data identification information is used for identifying multimedia data that needs to be recorded; and an instruction sending unit 1003, configured to send the recording instruction to a recording device, so that the recording device identifies multimedia data corresponding to the multimedia data identification information and records the multimedia data.

Figure 7:
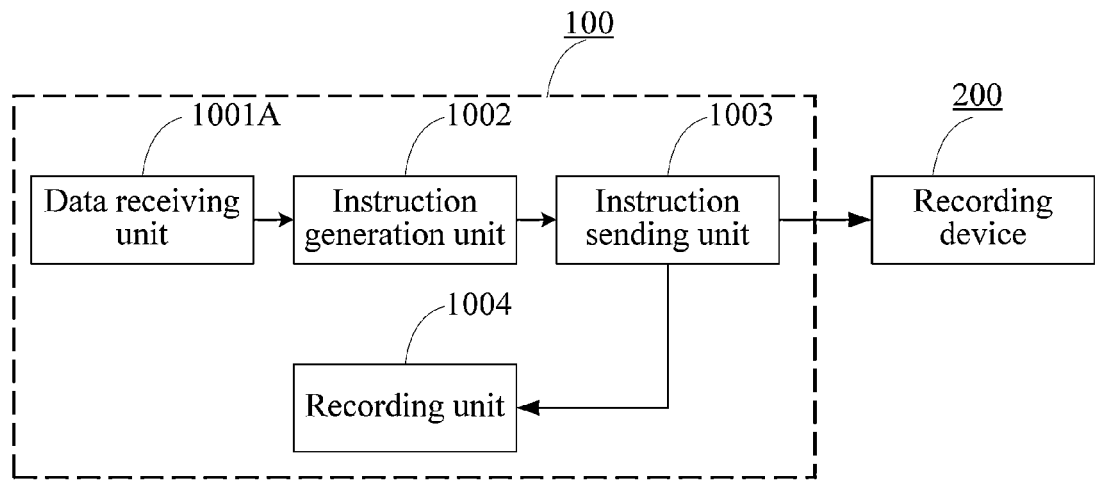
FIG. 7 is a schematic structural view of another device according to Embodiment 2 of the present invention.

As shown in FIG. 7, preferably, the distribution device 100 may further include a data receiving unit 1001A, where the data receiving unit is configured to receive data, the data includes signaling, the signaling is a signaling for establishing a channel for transmitting multimedia data. Specifically, the data may be received through a first network adapter (which may include one or more network adapters). The instruction generation unit is specifically configured to generate the recording instruction according to the signaling.

Preferably, the instruction generation unit is further configured to determine whether the signaling satisfies a first recording policy that is used for deciding the signaling corresponding to multimedia data that needs to be recorded. If yes, the instruction generation unit generates the recording instruction according to the signaling. For example, it is determined whether the signaling includes a calling number or a called number that is matched with a preset recording number, and if yes, the recording instruction is generated according to the signaling, where the recording number is specifically a number (for example, a telephone number) of a communication device corresponding to multimedia data that needs to be recorded; further, determine whether the signaling includes an IP address that is matched with a preset IP address, where the preset IP address specifically includes a source IP address or a destination IP address of the multimedia data that needs to be recorded, and if yes, generate the recording instruction according to the signaling.

Preferably, as the signaling includes session description protocol SDP information, the instruction generation unit is specifically configured to obtain an IP address from a connection information field (namely, line "c=") of the SDP information and generate a recording instruction including the IP address, or obtain a port number from a media name and transport address field (namely, line "m=") of the SDP information and generate a recording instruction that includes the port number, or obtain an IP address from a connection information field of the SDP information and obtain a port number from a media name and transport address field of the SDP information and generate a recording instruction including the IP address and the port number; or, specifically configured to obtain a call identifier from a call identifier Call-ID header field of the signaling and generate a recording instruction including the call identifier.

If the data includes signaling and multimedia data, the device may further include a signaling detection unit, configured to detect signaling from the data.

Preferably, if the distribution device further has the function of recording multimedia data, the distribution device may further include a recording unit 1004, and the instruction sending unit is further configured to send a recording instruction to the recording unit so as to instruct the recording unit to record multimedia data corresponding to the multimedia data identification information; and the recording unit records the multimedia data corresponding to the multimedia data identification information. Specifically, after receiving the recording instruction, the recording unit identifies, from the received multimedia data, multimedia data corresponding to multimedia data identification information included in the recording instruction and records the multimedia data corresponding to the multimedia data identification information. Preferably, the recording unit receives the multimedia data through a second network adapter (which may include one or more network adapters) or receives data that includes signaling and the multimedia data through a second network adapter and detects the multimedia data from the data.

The first network adapter and the second network adapter may be the same network adapter, and preferably, may also be different network adapters. In a scenario where the distribution device and an existing recording device are combined, if the first network adapter and the second network adapter are different network adapters, a network link for implementing the functions of receiving and detecting signaling and a network link for implementing the recording operation are separate in terms of a physical network, so that after the combination, the process of receiving and detecting signaling and the original process of recording by the recording device are independent of each other on a network link, thereby guaranteeing high performance of recording multimedia data.

Preferably, the instruction generation unit is specifically configured to generate the recording instruction according to a preset third recording policy, where the third recording policy is used for deciding multimedia data identification information of multimedia data that each recording device needs to record. The instruction generation unit may be specifically configured to obtain preset user identity information corresponding to each recording device, further obtain preset multimedia data identification information corresponding to the user identity information, and generate the recording instruction including the multimedia data identification information, where the user identity information may specifically be a telephone number (for example, a telephone number of a UC user, a telephone number of an agent), an ID of an agent, and the like, and the multimedia data identification information may be an IP address or a port number or an IP address and a port number; the instruction generation unit may be further specifically configured to obtain preset multimedia data identification information corresponding to each recording device, respectively, and generate the recording instruction including the multimedia data identification information. The generating the recording instruction including the multimedia data identification information may specifically be: generating one recording instruction for each recording device, respectively, and placing the obtained multimedia data identification information corresponding to each recording device in the recording instruction generated for the recording device, respectively; may be further specifically: generating the same recording instruction for all recording devices that communicate with the distribution device, placing the obtained multimedia data identification information corresponding to each recording device in the recording instruction, and carrying, in the recording instruction, the correspondence between the recording device and the multimedia data identification information corresponding to the recording device.

Figure 8:
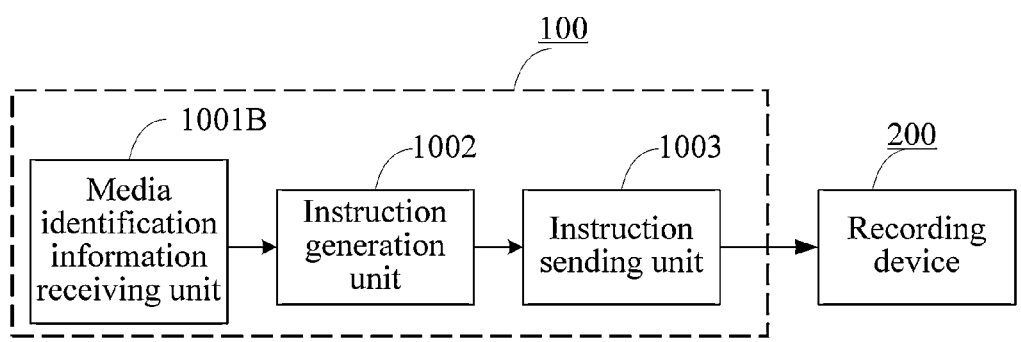
FIG. 8 is a schematic structural view of still another device according to Embodiment 2 of the present invention.

As shown in FIG. 8, the distribution device may further include a multimedia data identification information receiving unit 1001B, configured to receive multimedia data identification information, and specifically receive, from a control device, the multimedia data identification information obtained by the control device from received signaling; the instruction generation unit is specifically configured to generate the recording instruction including the multimedia data identification information. Preferably, the multimedia data identification information receiving unit is further configured to obtain a calling number or a called number corresponding to the multimedia data identification information, and the instruction generation unit is further configured to determine whether the calling number or the called number is matched with a preset recording number, and when the determination result is yes, generate the recording instruction including the multimedia data identification information.

Preferably, the device further includes a recording device decision unit, configured to decide, according to a preset second recording policy, a recording device for recording the multimedia data corresponding to the multimedia data identification information; the instruction sending unit is specifically configured to send the recording instruction to the decided recording device; or, the instruction sending unit is specifically configured to send the recording instruction to all recording devices that communicate with the distribution device, so that each recording device determines whether the multimedia data corresponding to the multimedia data identification information included in the recording instruction is the multimedia data that the recording device is instructed to record, and when the determination result is yes, record the multimedia data.

Specifically, a dedicated hardware circuit (for example, a hardware circuit such as a field programmable gate array (FPGA, field programmable gate array)) may be used to implement a part or all of the functions of the distribution device; specifically, the hardware circuit is adopted to implement the function of one or more units included in the distribution device, thereby further improving the performance of a distribution device.

Fro the specific function implementation of the distribution device 100. reference may be made to Embodiment 1 of the present invention.

According to Embodiment 1 of the present invention, Embodiment 3 of the present invention provides a recording device for recording multimedia data 200.

Figure 9:
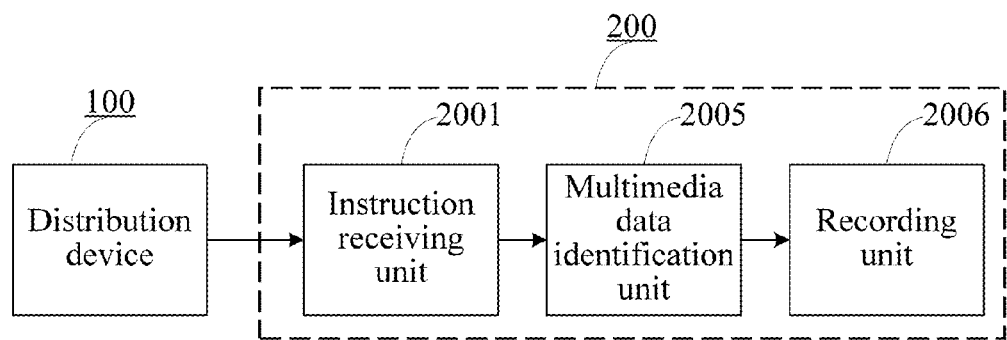
FIG. 9 is a schematic structural view of a device according to Embodiment 3 of the present invention.

As shown in FIG. 9, the recording device for recording multimedia data 200 includes:

an instruction receiving unit 2001, configured to receive a recording instruction from a distribution device, where the recording instruction includes multimedia data identification information, and the multimedia data identification information is used for identifying multimedia data that needs to be recorded;

a multimedia data identification unit 2005, configured to identify, according to the multimedia data identification information, the multimedia data that needs to be recorded; and a recording unit 2006, configured to record the multimedia data.

Figure 10:
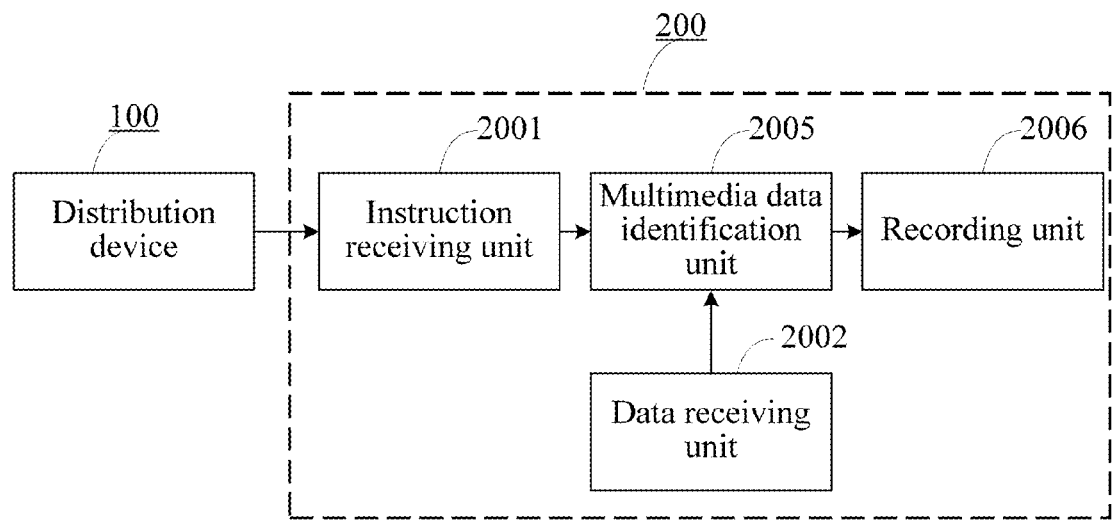
FIG. 10 is a schematic structural view of another device according to Embodiment 3 of the present invention.

Optionally, as shown in FIG. 10, the recording device may further include a data receiving unit 2002, configured to receive data, where the data includes multimedia data, and preferably, specifically configured to receive the data from a mirrored switch. The multimedia data identification unit is specifically configured to identify, from the received multimedia data, multimedia data corresponding to the multimedia data identification information.

The specific function implementation of the multimedia data identification unit included in the recording instruction is as follows:

As the multimedia data identification information specifically includes a call identifier, the multimedia data identification unit is specifically configured to determine whether a received data packet includes the call identifier, and if yes, decide that data included in the data packet is the multimedia data that needs to be recorded.

Alternatively, the multimedia data identification information specifically includes a call identifier, the multimedia data identification unit is specifically configured to obtain signaling including the call identifier according to the call identifier (for example, finding signaling containing the call identifier from the received signaling through matching), obtain an IP address from the obtained signaling, determine whether a destination IP address or a source IP address in a received data packet is the obtained IP address, and if the determination result is yes, decide that data included in the data packet is the multimedia data that needs to be recorded; or obtain a port number from the obtained signaling, determine whether a destination port number or a source port number in a received data packet is the obtained port number, and if the determination result is yes, decide that data included in the data packet is the multimedia data that needs to be recorded; or, obtain an IP address and a port number from the obtained signaling, determine whether a destination IP address and a destination port number in a received data packet are the obtained IP address and port number, and if the determination result is yes, decide that data included in the data packet is the multimedia data that needs to be recorded; or, obtain an IP address and a port number from the obtained signaling, determine whether a source IP address and a source port number in a received data packet are the obtained IP address and port number, and if the determination result is yes, decide that data included in the data packet is the multimedia data that needs to be recorded.

Alternatively, the multimedia data identification information specifically includes an IP address, the multimedia data identification unit is specifically configured to determine whether a destination IP address or a source IP address in a received data packet is the IP address included in the recording instruction, and if the determination result is yes, decide that data included in the data packet is the multimedia data that needs to be recorded.

Alternatively, the multimedia data identification information specifically includes a port number, the multimedia data identification unit is specifically configured to determine whether a destination port number or a source port number in a received data packet is the port number included in the recording instruction, and if the determination result is yes, decide that data included in the data packet is the multimedia data that needs to be recorded.

Alternatively, the multimedia data identification information specifically includes an IP address and a port number, the multimedia data identification unit is specifically configured to determine whether a destination IP address and a destination port number in a received data packet are the IP address and the port number that are included in the recording instruction, and if the determination result is yes, decide that data included in the data packet is the multimedia data that needs to be recorded; or, as the multimedia data identification information specifically includes an IP address and a port number, the recording device determines whether a source IP address and a source port number in a received data packet are the IP address and the port number that are included in the recording instruction, and if the determination result is yes, decides that data included in the data packet is the multimedia data that needs to be recorded.

Preferably, the data received by the data receiving unit specifically includes signaling and multimedia data; the device further includes a multimedia data detection unit, configured to detect multimedia data from the received data; the multimedia data identification unit is specifically configured to identify the multimedia data, which needs to be recorded, from the detected multimedia data according to the multimedia data identification information.

Figure 11:
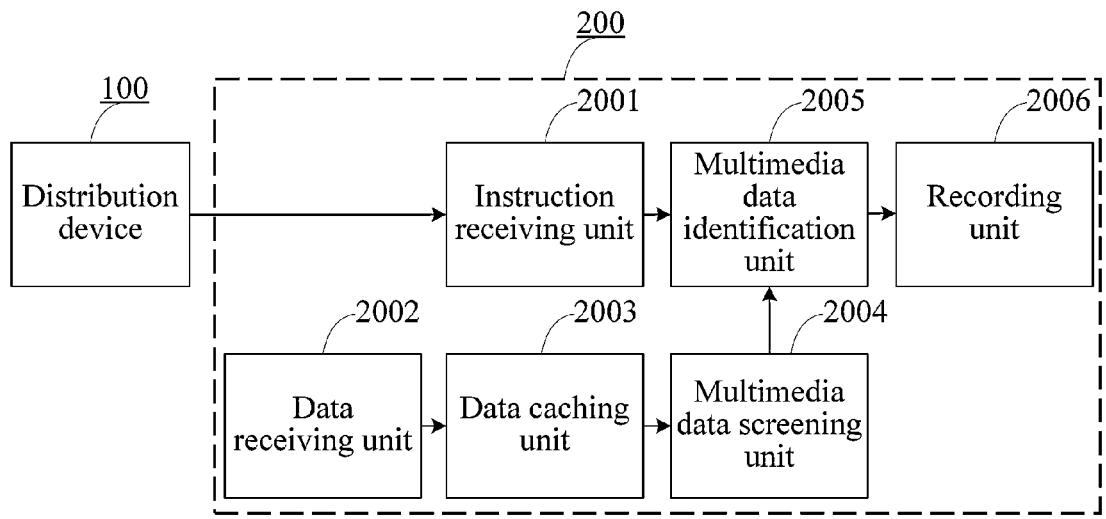
FIG. 11 is a schematic structural view of still another device according to Embodiment 3 of the present invention.

As shown in FIG. 11, preferably, the recording device 200 further includes a multimedia data screening unit 2004, where the multimedia data screening unit is configured to screen received multimedia data to acquire multimedia data corresponding to a multimedia data identification information set, the multimedia data identification information set may specifically be preconfigured or obtained from the distribution device or generated according to the multimedia data identification information included in the previously received recording instruction, and the multimedia data identification information set may be specifically an IP address range or a port number range or an IP address range and a port number range; the multimedia data identification unit is specifically configured to: according to the multimedia data identification information included in the recording instruction, identify the multimedia data, which needs to be recorded, from the multimedia data that is acquired through screening.

Preferably, the recording device 200 further includes a data caching unit 2003, configured to cache received data in real time, where the data includes multimedia data; the multimedia data screening unit is specifically configured to screen the cached multimedia data to acquire the multimedia data corresponding to the multimedia data identification information set.

Preferably, the instruction receiving unit receives the recording instruction through a third network adapter (which may include one or more network adapters); and the data receiving unit receives the data through a fourth network adapter (which may include one or more network adapters).

The third network adapter and the fourth network adapter may be the same network adapter, and preferably, may also be different network adapters; if the third network adapter and the fourth network adapter are different network adapters, the network link via which the recording device and the distribution device perform communication (for example, receiving a recording instruction) and the network link for implementing a recording operation are separate in terms of a physical network and are independent of each other, thereby improving performance of the recording device.

Specifically, a dedicated hardware circuit (for example, a hardware circuit such as a FPGA) may be used to implement a part or all of the functions of the recording device; specifically, the hardware circuit is used to implement the function of one or more units included in the recording device, thereby further improving performance of a recording device.

For the specific function implementation of the recording device, reference may be made to Embodiment 1 of the present invention.

According to Embodiments 1 to 3 of the present invention, Embodiment 4 of the present invention provides a system for recording multimedia data.

Figure 12:
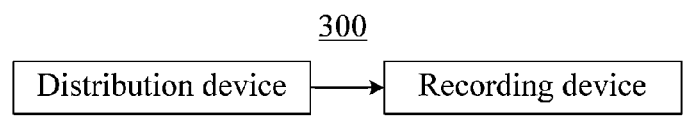
FIG. 12 is a schematic structural view of a system according to Embodiment 4 of the present invention.

As shown in FIG. 12, the recording system for recording multimedia data includes:

a distribution device, which is specifically the distribution device in Embodiment 2; and a recording device, which is specifically the recording device in Embodiment 3.

Preferably, the recording system further includes a first mirrored switch, and the recording device receives multimedia data from the first mirrored switch. Optionally, the system further includes a second mirrored switch, and the distribution device receives signaling from the second mirrored switch. It should be noted that the first mirrored switch and the second mirrored switch may be a same mirrored switch.

The recording system may further include a storage device, where the storage device is configured to store a multimedia data file recorded by the recording device.

Optionally, the recording system further includes a control device, the distribution device receives signaling or multimedia data identification information from the control device, and if the distribution device receives the multimedia data identification information from the control device, specifically, the control device is configured to obtain multimedia data identification information from the received signaling and send the obtained multimedia data identification information to the distribution device, and the distribution device is specifically configured to generate the recording instruction including the multimedia data identification information. Preferably, the control device is further configured to obtain, from the signaling, a calling number or a called number corresponding to the multimedia data identification information and send the calling number and the called number to the distribution device, and the distribution device is further configured to determine whether the calling number or the called number is matched with a preset recording number, and if the determination result is yes, generate the recording instruction including the multimedia data identification information.

For the specific function implementation of the recording system, reference may be made to Embodiments 1 to 3 of the present invention.

The distribution device in Embodiments 1 and 2 of the present invention can be implemented by electronic hardware or a combination of computer software and electronic hardware. If it is implemented by a combination of computer software and electronic hardware, specifically, it may be implemented by running a computer program on a computer. The computer program includes a program code, and the method in Embodiment 1 of the present invention may be implemented by running the computer program on a computer. The computer includes a PC, a server, a PAD, or a notebook computer etc.

Figure 13:
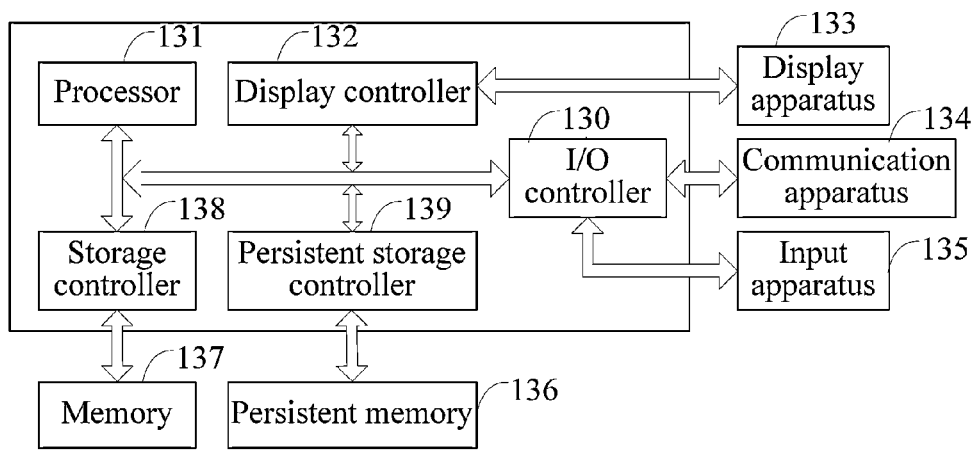
FIG. 13 is a schematic structural view of a computer system according to an embodiment of the present invention.

The schematic structural view of the system of the computer is shown in FIG. 13, which includes a processor 131, a memory 137, a storage controller 138, a communication apparatus 134, and may further include a persistent memory 136, a persistent storage controller 139, a display apparatus 133, a display controller 132, an input apparatus 135, and an I/O controller 130.

The memory 137 is configured to store a computer program and data, the computer program includes a program code, and the program code includes a computer operation instruction. The computer operation instruction includes a computer operation instruction for implementing the function of each unit of the distribution device provided in Embodiment 2 of the present invention. The data includes data needed for processing the computer operation instruction and data generated in executing the computer operation instruction, and may specifically include data (include signaling) received by a distribution device, multimedia data identification information obtained from signaling, a preset recording policy written in a memory, received multimedia data identification information, a generated recording instruction, and the like. The memory 137 is specifically a volatile memory.

The storage controller 138 is configured to address and access operation instructions and data that are stored in the memory 137. The storage controller 138 is controlled by the processor 131.

The processor 131 is configured to execute a computer program stored in a memory. The processor 131 is a central processing unit (CPU) and is a core unit of a computer.

The persistent memory 136 is configured to persistently store an application, an operating system, and file data. The application may specifically include an application corresponding to a computer program of the distribution device, and the stored file data specifically includes a file saving a preset recording policy. The persistent memory 136 includes, but is not limited to, a magnetic disk, a magnetic tape, a memory card, and the like.

The persistent storage controller 139 is configured to address and access an application, an operating system, and file data in the persistent memory 136. The persistent memory 136 is controlled by the processor 131.

The display apparatus 133 is configured to present a processing result of a computer. The processing result of a computer may be specifically an operation process and an operation result in Embodiments 1 and 2, which includes a configuration process and a configuration result of configuring a recording policy. The display apparatus 133 includes, but is not limited to, a display, a display screen, a touchscreen, and the like.

The display controller 132 is configured to control the display apparatus 133 to present the processing result of the computer.

The input apparatus 135 is configured to input an operation instruction. The operation instruction may specifically include an operation instruction for configuring a recording policy in Embodiments 1 and 2. The input apparatus 135 includes, but is not limited to, a keyboard, a mouse, a touchscreen, and the like.

The I/O controller 130 is configured to control input and output of a computer system. The I/O controller 130 is specifically configured to control input of the input apparatus 135.

The communication apparatus 134 is configured to connect the distribution device to the Internet, an intranet or a local area network. Specifically, in Embodiments 1 and 2, the distribution device may receive information through the communication apparatus 134, for example, receive signaling, multimedia data identification information, a recording number set that is sent by a control device, and the like, and may further send information through the communication apparatus 134, for example, send a recording instruction, recording additional information, and the like to the recording device. The communication apparatus 134 includes, but is not limited to, a network adapter, a GPRS module, a WIFI module, a 3G module, and the like.

The recording device in Embodiments 1 and 3 of the present invention may be implemented by electronic hardware or a combination of computer software and electronic hardware. If it is implemented by a combination of computer software and electronic hardware, specifically, it may be implemented by running a computer program on a computer, the computer program includes a program code, and the method in Embodiment 1 of the present invention may be implemented by running the computer program on a computer. The computer includes, but is not limited to, a PC, a server, a PAD, and a notebook computer.

The system structure of the computer includes a processor, a memory, a storage controller, and a communication apparatus, and may further include a persistent memory, a persistent storage controller, a display apparatus, a display controller, an input apparatus, an I/O controller.

The memory is configured to store a computer program and data, the computer program includes a program code, and the program code includes a computer operation instruction. The computer operation instruction includes a computer operation instruction for implementing the function of each unit of the recording device provided in Embodiment 3 of the present invention. The data includes data needed for processing the computer operation instruction and data generated in executing the computer operation, and may specifically include data received by a recording device (which includes multimedia data), a multimedia data identification information set, a recording instruction received from the distribution device, and the like. The memory is specifically a volatile memory.

The storage controller is configured to address and access the operation instruction and data that are stored in the memory. The storage controller is controlled by the processor.

The main processor is configured to execute a computer program stored in a memory. The main processor is the central processing unit (CPU) and is a core unit of a computer.

The persistent memory is configured to persistently store an application, an operating system, and file data. The application may specifically include an application corresponding to a computer program of the recording device, and the stored file data specifically includes a multimedia data file saving the records and generation in Embodiments 1 and 3, a database file for recording communication-related description information, and the like. The persistent storage apparatus includes, but is not limited to, a magnetic disk, a magnetic tape, a memory card, and the like.

The persistent storage controller is configured to address and access an application, an operating system, and file data in the persistent memory. The persistent memory is controlled by the processor.

The display apparatus is configured to present a processing result of a computer. The processing result of a computer may be a recording result, and the like. The display apparatus includes, but is not limited to, a display, a display screen, a touchscreen, and the like.

The display controller is configured to control the display apparatus to present the processing result of a computer.

The input apparatus is configured to input an operation instruction. The operation instruction may specifically include an operation instruction for configuring a multimedia data identification information set in Embodiments 1 and 3. The input apparatus includes, but is not limited to, a keyboard, a mouse, a touchscreen, and the like.

The I/O controller is configured to control input and output of a computer system. The I/O controller is specifically configured to control input of the input apparatus.

The communication apparatus is configured to connect the recording device to the Internet, an intranet or a local area network. Specifically, in Embodiments 1 and 3, the recording device may receive information through the communication apparatus, for example, receive multimedia data, a recording instruction sent by the distribution device, recording additional information sent by the distribution device, and the like, and may further send information with the communication apparatus, for example, send a recorded multimedia data file to the storage device. The communication apparatus includes, but is not limited to, a network adapter, a GPRS module, a WIFI module, and a 3G module.

According to Embodiment 1 and Embodiment 2 of the present invention, Embodiment 5 of the present invention provides a distribution device for recording multimedia data.

The distribution device includes a processor and a memory. The memory is configured to store instructions, and the processor executes the instructions to perform the operations as follows:

A distribution device generates a recording instruction, where the recording instruction includes multimedia data identification information, and the multimedia data identification information is used for identifying multimedia data that needs to be recorded, and sends the recording instruction to a recording device, so that the recording device identifies the multimedia data corresponding to the multimedia data identification information and records the multimedia data.

The distribution device may receive signaling which is used to establishing a channel for transmitting the multimedia data. After receiving the signaling, the distribution device obtains the multimedia data identification information according to the signaling, and generates the recording instruction including the multimedia data identification information. The multimedia data identification information may include a call identifier corresponding to the multimedia data or an IP address corresponding to the multimedia data or a port number corresponding to the multimedia data or an IP address and a port number that are corresponding to the multimedia data. The obtaining the multimedia data identification information according to the signaling may be: obtaining a call identifier from a call identifier header field of the signaling, and using the call identifier as the multimedia data identification information; and may further specifically be: as the signaling includes session description protocol SDP information, obtaining an IP address from a connection information field of the SDP information, and using the IP address as the multimedia data identification information; or, obtaining a port number from a media name and transport address field of the SDP information, and using the port number as the multimedia data identification information; or, obtaining an IP address from a connection information field of the SDP information, obtaining a port number from a media name and transport address field of the SDP information, and using the IP address and the port number as the multimedia data identification information. After obtaining the multimedia data identification information, the distribution device may further record the obtained multimedia data identification information in a memory first, obtain recording instruction information for instructing recording of the multimedia data corresponding to the multimedia data identification information, and then generate the recording instruction.

In another possible implementation manner, the signaling received by the distribution device includes the multimedia data identification information, after the signaling is received, the signaling may be further directly used as the recording instruction.

In combination with the foregoing two implementation manners, before the distribution device generates the recording instruction, the method further includes: deciding that the signaling satisfies a preset first recording policy, where the first recording policy is used for deciding signaling corresponding to multimedia data that needs to be recorded, which may be specifically, deciding that the signaling includes a calling number or a called number that is matched with a preset recording number; or, deciding that the signaling includes an IP address that is matched with a preset IP address. It should be noted that, the preset first recording policy is stored in the persistent memory and loaded into the memory, and before deciding that the signaling satisfies a preset first recording policy, the distribution device reads the first recording policy from the memory.

In another possible implementation manner, the distribution device receives the multimedia data identification information from a control device, and generates the recording instruction including the multimedia data identification information. Preferably, the distribution device further receives, from the control device, a calling number or a called number corresponding to the multimedia data identification information, decides that the calling number or the called number is matched with a preset recording number, and generates the recording instruction including the multimedia data identification information.

In combination with the foregoing three implementation manners, preferably, the distribution device may decide, according to a preset second recording policy, a recording device for recording the multimedia data, and send the recording instruction to the decided recording device. It should be noted that the preset second recording policy is stored in a persistent memory and loaded into the memory, and before deciding, according to a preset second recording policy, a recording device for recording the multimedia data, the distribution device reads the second recording policy from the memory. Optionally, the distribution device may further send the recording instruction to all recording devices that communicate with the distribution device, so that each recording device in all the recording devices determines whether the multimedia data corresponding to the multimedia data identification information included in the recording instruction is the multimedia data that the recording device is instructed to record, and records the multimedia data when the determination result is yes.

In another possible implementation manner, the distribution device may generate the recording instruction according to a preset third recording policy, and the third recording policy is used for deciding multimedia data identification information corresponding to multimedia data that the recording device needs to record. Specifically, the distribution device may obtain preset user identity information corresponding to the recording device, obtain preset multimedia data identification information corresponding to the user identity information, and generate the recording instruction including the multimedia data identification information; the distribution device may further obtain preset multimedia data identification information corresponding to the recording device, and generate the recording instruction including the multimedia data identification information. The multimedia data identification information may include an IP address corresponding to the multimedia data or a port number corresponding to the multimedia data or an IP address and a port number that are corresponding to the multimedia data. It should be noted that, the preset third recording policy is stored in the persistent memory and loaded into the memory. Before generating the recording instruction according to a preset third recording policy, the distribution device reads the third recording policy from the memory.

In combination with the foregoing four implementation manners, the recording instruction may further include a data type of multimedia data that needs to be recorded, so that the recording device records the multimedia data corresponding to the data type.

For the specific implementation of the distribution device, reference may be made to Embodiment 1 of the present invention.

According to Embodiment 1 and Embodiment 3 of the present invention, Embodiment 6 of the present invention provides a recording device for recording multimedia data.

The recording device includes a processor and a memory, the memory is configured to store an operation instruction, and the processor executes the operation instruction to implement the functions as follows.

A recording device receives a recording instruction from a distribution device, where the recording instruction includes multimedia data identification information, and the multimedia data identification information is used for identifying multimedia data that needs to be recorded, identifies, according to the multimedia data identification information, the multimedia data that needs to be recorded, and records the multimedia data. The multimedia data identification information may specifically include a call identifier corresponding to multimedia data or an IP address corresponding to the multimedia data or a port number corresponding to the multimedia data.

The identifying, according to the multimedia data identification information, the multimedia data that needs to be recorded may specifically be: as the multimedia data identification information specifically includes a call identifier, determining, by the recording device, whether a received data packet includes the call identifier, and if includes, deciding that data included in the data packet is the multimedia data that needs to be recorded, which may further specifically be: as the multimedia data identification information specifically includes a call identifier, obtaining, by the recording device, signaling including the call identifier according to the call identifier, obtaining a port number from the obtained signaling, determining whether a destination port number or a source port number in a received data packet is the obtained port number, and if the determination result is yes, deciding that data included in the data packet is the multimedia data that needs to be recorded; or, obtaining an IP address and a port number from the obtained signaling, determining whether a destination IP address and a destination port number in a received data packet are the obtained IP address and port number, if the determination result is yes, and deciding that data included in the data packet is the multimedia data that needs to be recorded; or, obtaining an IP address and a port number from the obtained signaling, determining whether a source IP address and a source port number in a received data packet are the obtained IP address and port number, and if the determination result is yes, deciding that data included in the data packet is the multimedia data that needs to be recorded; and may further specifically be: as the multimedia data identification information specifically includes an IP address, determining, by the recording device, whether a destination IP address or a source IP address in a received data packet is the IP address included in the recording instruction, and if the determination result is yes, deciding that data included in the data packet is the multimedia data that needs to be recorded; or, as the multimedia data identification information specifically includes a port number, determining, by the recording device, whether a destination port number or a source port number in a received data packet is the port number included in the recording instruction, and if the determination result is yes, deciding that data included in the data packet is the multimedia data that needs to be recorded; or, as the multimedia data identification information includes an IP address and a port number, determining, by the recording device, whether a destination IP address and a destination port number in a received data packet are the IP address and the port number that are included in the recording instruction, and if the determination result is yes, deciding that data contained in the data packet is the multimedia data that needs to be recorded; or, as the multimedia data identification information specifically includes an IP address and a port number, determining, by the recording device, whether a source IP address and a source port number in a received data packet are the IP address and the port number that are included in the recording instruction, and if the determination result is yes, deciding that data contained in the data packet is the multimedia data that needs to be recorded.

Preferably, the recording device screens received multimedia data to acquire multimedia data corresponding to a multimedia data identification information set, and according to the multimedia data identification information, identifies the multimedia data, which needs to be recorded, from the multimedia data that is acquired from screening, where the multimedia data identification information set is preconfigured or obtained from the distribution device or generated according to the multimedia data identification information included in the previously received recording instruction. The multimedia data identification information set may specifically include an IP address range or a port number range.

For the specific implementation of the recording device, reference may be made to Embodiment 1 of the present invention.

According to Embodiments 1, 5, and 6 of the present invention, Embodiment 7 of the present invention provides a recording system for recording multimedia data.

The system for recording multimedia data includes:

a distribution device, which is specifically the distribution device in Embodiment 5; and a recording device, which is specifically the recording device in Embodiment 6.

Preferably, the recording system further includes a first mirrored switch, and the recording device receives multimedia data from the first mirrored switch; optionally, the system further includes a second mirrored switch, and the distribution device receives signaling from the second mirrored switch. It should be noted that the first mirrored switch and the second mirrored switch may be the same mirrored switch.

The recording system may further include a storage device, where the storage device is configured to store a multimedia data file recorded by the recording device.

Optionally, the recording system further includes a control device, the distribution device receives signaling or multimedia data identification information from the control device, and if the distribution device receives multimedia data identification information from the control device, specifically, the control device is configured to obtain multimedia data identification information from the received signaling and send the obtained multimedia data identification to the distribution device, and the distribution device is specifically configured to generate the recording instruction including the multimedia data identification information; preferably, the control device is further configured to obtain, from the signaling, a calling number or a called number corresponding to the multimedia data identification information and send the calling number and the called number to the distribution device, and the distribution device is further configured to determine whether the calling number or the called number is matched with the preset recording number, and if the determination result is yes, generate the recording instruction including the multimedia data identification information.

For the specific function implementation of the recording system, reference may be made to Embodiments 1, 5, and 6 of the present invention.

Persons skilled in the art should appreciate that, in combination with the examples described in the embodiments here, units and algorithm steps can be implemented by electronic hardware, or a combination of computer software and electronic hardware. Whether the functions are executed by hardware or software depends on the particular applications and design constraint conditions of the technical solutions. Persons skilled in the art may use different methods to implement the described functions for every particular application, but it should not be considered that the implementation goes beyond the scope of the present invention.

It may be clearly understood by persons skilled in the art that, for the purpose of convenient and brief description, for a detailed working process of the foregoing system, apparatus and unit, reference may be made to the corresponding process in the method embodiments, and the details are not described here again.

In the embodiments provided in the present application, it should be understood that the disclosed system, device, and method may be implemented in other manners. For example, the described device embodiments are merely exemplary. For example, the unit division is merely logical function division and may be other division in actual implementation. For example, multiple units or components may be combined or integrated into another system, or some features may be ignored or not performed. In addition, displayed or discussed mutual couplings or direct couplings or communication connections may be implemented through some interfaces. The indirect couplings or communication connections between devices or units may be implemented in electronic, mechanical or other forms.

The units described as separate parts may or may not be physically separate, and parts displayed as units may or may not be physical units, may be located in one position, or may be distributed on multiple network elements. A part or all of the units may be selected according to the actual needs to achieve the objectives of the solutions of the embodiments.

In addition, each functional unit in each embodiment of the present invention may be integrated into a processing unit, or each unit may exist alone physically, or two or more units are integrated into a unit.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, a network device, and the like) to execute all or part of the steps of the method described in the embodiment of the present invention. The foregoing storage medium includes: any medium that may store program code, such as a U-disk, a removable hard disk, a read-only memory (ROM), a random access memory (RAM), a magnetic disk, or a CD-ROM.

The foregoing descriptions are merely exemplary embodiments of the present invention, but not intended to limit the protection scope of the present invention. Any variation or replacement made by persons skilled in the art without departing from the idea of the present invention shall fall within the protection scope of the present invention. Therefore, the protection scope of the present invention shall be subject to the appended claims.

What is claimed is:

1. A method for recording multimedia data of communications between communication devices in a system comprising a mirror switch, a distribution device and a plurality of recording devices, wherein the method is performed by the distribution device and comprises:
   receiving communication data sent from the mirror switch, the communication data comprising first multimedia data of a first call, second multimedia data of a second call, and a first signaling message and a second signaling message used to establish channels for transmitting the first multimedia data and the second multimedia data respectively;
   obtaining first multimedia data identification information corresponding to the first multimedia data from the first signaling message, and obtaining second multimedia data identification information corresponding to the second multimedia data from the second signaling message;
   generating a first recording instruction including the first multimedia data identification information and a second recording instruction including the second multimedia data identification information;
   identifying a first recording device and a second recording device from the plurality of recording devices;
   sending the first recording instruction to the first recording device to instruct the first recording device to record the first multimedia data of the first call without sending the first multimedia data of the first call to the first recording device; and
   sending the second recording instruction to the second recording device to instruct the second recording device to record the second multimedia data of the second call without sending the second multimedia data of the second call to the second recording device;
   wherein the first signaling message is a Session Description Protocol (SDP) message, and the first multimedia data identification information is an IP address included in a connection information field of the SDP message, and
   wherein the second signaling message is an SDP message, and the second multimedia data identification information is an IP address including in a connection information field of the SDP message.

2. The method according to claim 1,
   wherein the first signaling message is a Session Initiation Protocol (SIP) message, and the first multimedia data identification information is a call identifier included in a call identifier header of the SIP message,
   wherein the second signaling message is a SIP message, and the second multimedia data identification information is a call identifier included in a call identifier header of the SIP message.

3. The method according to claim 1,
   wherein the first signaling message is a Session Description Protocol (SDP) message, and the first multimedia data identification information is a port number included in a media name and transport address field of the SDP message,
   wherein the second signaling message is an SDP message, and the second multimedia data identification information is a port number included in a media name and transport address field of the SDP message.

4. The method according to claim 1, further comprising:
determining that the first multimedia data needs to be recorded by comparing a preset IP address or port number with an IP address or port number included in the first signaling message; and
determining that the second multimedia data needs to be recorded by comparing a preset IP address or port number with an IP address or port number included in the second signaling message.

5. The method according to claim 1, further comprising:
determining that the first multimedia data needs to be recorded by comparing a preset calling number or called number with a calling number or a called number included in the first signaling message; and
determining that the second multimedia data needs to be recorded by comparing a preset calling number or called number with a calling number or a called number included in the second signaling message.

6. The method according to claim 1, wherein the distribution device identifies the first recording device and the second recording device based on a load balance for the plurality of recording devices.

7. A distribution device which is configured to receive multimedia data of communications between network devices and assign recording devices to record the multimedia data, comprising:
a hardware processor; and
a memory storing instructions executable by the hardware processor to perform operations comprising:
receiving, from a mirror switch, communication data comprising first multimedia data of a first call, second multimedia data of a second call, and a first signaling message and a second signaling message used to establish channels for transmitting the first multimedia data and the second multimedia data respectively;
obtaining first multimedia data identification information corresponding to the first multimedia data from the first signaling message, and obtaining second multimedia data identification information corresponding to the second multimedia data from the second signaling message;
generating a first recording instruction including the first multimedia data identification information and a second recording instruction including the second multimedia data identification information;
identifying a first recording device and a second recording device from a plurality of recording devices;
sending the first recording instruction to the first recording device to instruct the first recording device to record the first multimedia data of the first call without sending the first multimedia data of the first call to the first recording device; and
sending the second recording instruction to the second recording device to instruct the second recording device to record the second multimedia data of the second call without sending the second multimedia data of the second call to the second recording device;
wherein the first signaling message is a Session Description Protocol (SDP) message, and the first multimedia data identification information is an IP address included in a connection information field of the SDP message, and
wherein the second signaling message is an SDP message, and the second multimedia data identification information is an IP address included in a connection information field of the SDP message.

8. The distribution device according to claim 7,
wherein the first signaling message is a Session Initiation Protocol (SIP) message, and the first multimedia data identification information is a call identifier included in a call identifier header field of the SIP message,
wherein the second signaling message is a SIP message, and the second multimedia data identification information is a call identifier included in a call identifier header field of the SIP message.

9. The distribution device according to claim 7,
wherein the first signaling message is a Session Description Protocol (SDP) message, and the first multimedia data identification information is a port number included in a media name and transport address field of the SDP message,
wherein the second signaling message is an SDP message, and the second multimedia data identification information is a port number included in a media name and transport address field of the SDP message.

10. The distribution device according to claim 7, wherein the operations further comprises:
determining that the first multimedia data needs to be recorded by comparing a preset calling number or called number with a calling number or a called number included in the first signaling message; and
determining that the second multimedia data needs to be recorded by comparing a preset calling number or called number with a calling number or a called number included in the second signaling message.

11. The distribution device according to claim 7, wherein the operations further comprises:
determining that the first multimedia data needs to be recorded by comparing a preset IP address with the IP address included in the first signaling message; and
determining that the second multimedia data needs to be recorded by comparing a preset IP address with the IP address included in the second signaling message.

12. The distribution device according to claim 9, wherein the operations further comprises:
determining that the first multimedia data needs to be recorded by comparing a preset port number with the port number included in the first signaling message; and
determining that the second multimedia data needs to be recorded by comparing a preset port number with the port number included in the second signaling message.

13. The distribution device according to claim 7,
wherein the distribution device is integrated with a recording device.

14. The distribution device according to claim 7,
wherein the hardware processor identifies the first recording device and the second recording device based on a load balance of the plurality of recording devices.

* * * * *